(12) United States Patent
Oba et al.

(10) Patent No.: US 12,470,576 B2
(45) Date of Patent: Nov. 11, 2025

(54) COMMUNICATION MONITORING METHOD AND COMMUNICATION MONITORING SYSTEM

(71) Applicant: Panasonic Intellectual Property Corporation of America, Torrance, CA (US)

(72) Inventors: Tatsumi Oba, Osaka (JP); Hiroyuki Okada, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 366 days.

(21) Appl. No.: 18/093,631

(22) Filed: Jan. 5, 2023

(65) Prior Publication Data

US 2023/0141747 A1 May 11, 2023

Related U.S. Application Data

(63) Continuation of application No. PCT/JP2021/025530, filed on Jul. 6, 2021.
(Continued)

(30) Foreign Application Priority Data

Nov. 20, 2020 (JP) .................... 2020-193196

(51) Int. Cl.
*H04L 9/40* (2022.01)
*H04L 41/14* (2022.01)
(Continued)

(52) U.S. Cl.
CPC .......... *H04L 63/1425* (2013.01); *H04L 41/16* (2013.01); *H04L 63/166* (2013.01)

(58) Field of Classification Search
CPC .... H04L 63/1425; H04L 41/16; H04L 63/166
See application file for complete search history.

(56) References Cited

U.S. PATENT DOCUMENTS

| 11,108,809 B2 * | 8/2021 | Johns .................. G06F 21/56 |
| 11,928,208 B2 * | 3/2024 | Chiba .................. G06N 20/00 |

(Continued)

FOREIGN PATENT DOCUMENTS

| CN | 111200575 A | 5/2020 |
| JP | 2019-205136 | 11/2019 |
| WO | 2019/240020 A1 | 12/2019 |

OTHER PUBLICATIONS

Oba, et. al.; Graph Convolutional Network-based Suspicious Communication Pair Estimation for Industrial Control Systems; Jul. 17, 2020; 9 pages (Year: 2020).*

(Continued)

*Primary Examiner* — Oleg Survillo
(74) *Attorney, Agent, or Firm* — Wenderoth, Lind & Ponack, L.L.P.

(57) ABSTRACT

This method includes: extracting, from communication in a network, a first communication triplet that is a 3-tuple including information indicating a source device, information indicating a destination device, and information indicating the type of communication performed between devices; determining whether the first communication triplet extracted corresponds to any of a plurality of second communication triplets stored in storage in advance as a whitelist and each being a 3-tuple including information indicating a source device, information indicating a destination device, and information indicating the type of communication; and estimating, as a score, a possibility that the first communication triplet emerges as the communication, by using a model that has been trained, when the first communication (Continued)

triplet does not correspond to any of the plurality of second communication triplets.

18 Claims, 24 Drawing Sheets

Related U.S. Application Data

(60) Provisional application No. 63/052,036, filed on Jul. 15, 2020.

(51) Int. Cl.
*H04L 41/147* (2022.01)
*H04L 41/16* (2022.01)
*H04L 43/062* (2022.01)

(56) References Cited

U.S. PATENT DOCUMENTS

| | | | |
|---|---|---|---|
| 2019/0132344 A1* | 5/2019 | Lem | G06N 20/00 |
| 2019/0158520 A1* | 5/2019 | DiValentin | H04L 63/145 |
| 2020/0404010 A1* | 12/2020 | Costante | H04L 63/1416 |
| 2021/0006570 A1* | 1/2021 | Nakai | H04L 63/1416 |
| 2021/0067548 A1* | 3/2021 | Brandt | G06N 20/00 |
| 2021/0112062 A1* | 4/2021 | Shimizu | H04L 63/101 |
| 2021/0158161 A1* | 5/2021 | Louizos | G06N 3/045 |
| 2021/0203660 A1* | 7/2021 | Nagayama | H04L 63/101 |
| 2021/0209604 A1* | 7/2021 | Wang | G06Q 20/40 |
| 2021/0264026 A1* | 8/2021 | Amano | G06F 21/554 |
| 2021/0312042 A1* | 10/2021 | Ben-David | G06N 3/08 |
| 2022/0141242 A1* | 5/2022 | Shaya | H04L 43/12 726/23 |

OTHER PUBLICATIONS

International Search Report (ISR) issued on Sep. 28, 2021 in International (PCT) Application No. PCT/JP2021/025530.
Rafael Ramos Regis Barbosa, et al., "Flow whitelisting in SCADA networks", International Journal of Critical Infrastructure Protection, 2013.
Keith Stouffer, et al., "Guide to Industrial Control Systems (ICS) Security", National Institute of Standards and Technology, Special Publication 800-82, Jun. 2011.
Vern Paxson, et al., "Bro Intrusion Detection System (Software)", Lawrence Berkeley National Laboratory, Jan. 2006, URL: https://www.osti.gov/biblio/1245188-bro-intrusion-detection-system.
Bishan Yang, et al., "Embedding Entities and Relations for Learning and Inference in Knowledge Bases", International Conference on Learning Representations (ICLR), Aug. 2015.
Michael Schlichtkrull, et al., "Modeling Relational Data with Graph Convolutional Networks", European Semantic Web Conference (ESWC), 2018.
Shikhar Vashishth, et al., "Composition-based Multi-Relational Graph Convolutional Networks", International Conference on Learning Representations (ICLR), 2020.
Tim Dettmers, et al., "Convolutional 2D Knowledge Graph Embeddings", The Thirty-Second AAAI Conference on Artificial Intelligence (AAAI-18), 2018, pp. 1811-1818.
Antoine Bordes, et al., "Translating Embeddings for Modeling Multi-relational Data", Advances in Neural Information Processing Systems 26 (NIPS), 2013.
Maximilian Nickel, et al., "Holographic Embeddings of Knowledge Graphs", The Thirtieth AAAI Conference on Artificial Intelligence (AAAI-16), 2016, pp. 1955-1961.
Theo Trouillon, et al., "Complex Embeddings for Simple Link Prediction", The 33rd International Conference on Machine Learning (ICML), 2016.
Office Action and a search report issued Mar. 20, 2025 in corresponding Chinese patent application No. 202180048831.4, with English translation of the search report, 12 pages.

* cited by examiner

FIG. 4

| server's IP address | TCP/UDP port number | client's IP address |
|---|---|---|
| 192.168.1.10 | UDP/2222 | 192.168.1.30 |
| 192.168.1.20 | UDP/137 | 192.168.1.10 |
| 192.168.1.20 | UDP/139 | 192.168.1.40 |
| ... | ... | ... |

FIG. 5

| server's IP address | TCP/UDP port number | client's IP address |
|---|---|---|
| 192.168.1.10 | UDP/2222 | 192.168.1.30 |
| 192.168.1.20 | UDP/137 | 192.168.1.10 |
| 192.168.1.20 | UDP/139 | 192.168.1.40 |
| 192.168.1.20 | Alert 01-002 | 192.168.1.10 |
| ... | ... | ... |

FIG. 6A
| Source device | Type of communication | Destination device |
|---|---|---|
| A | HTTP | B |
| A | HTTP | C |
| D | SMB | A |
| A | MSSQL | B |
FIG. 6B
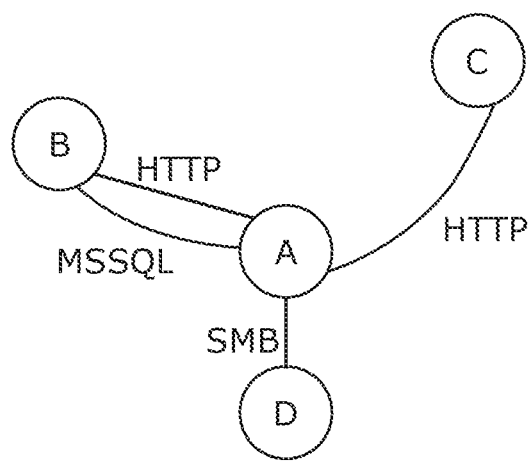
FIG. 6C
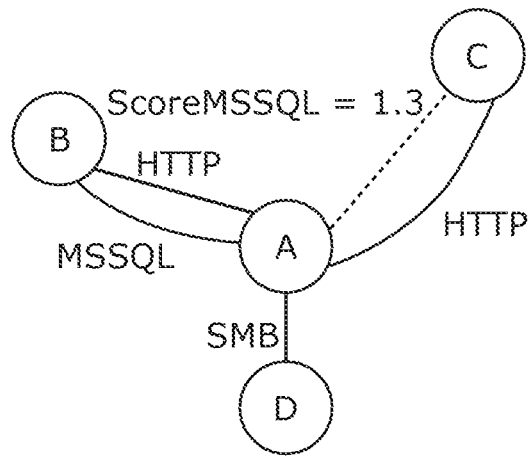

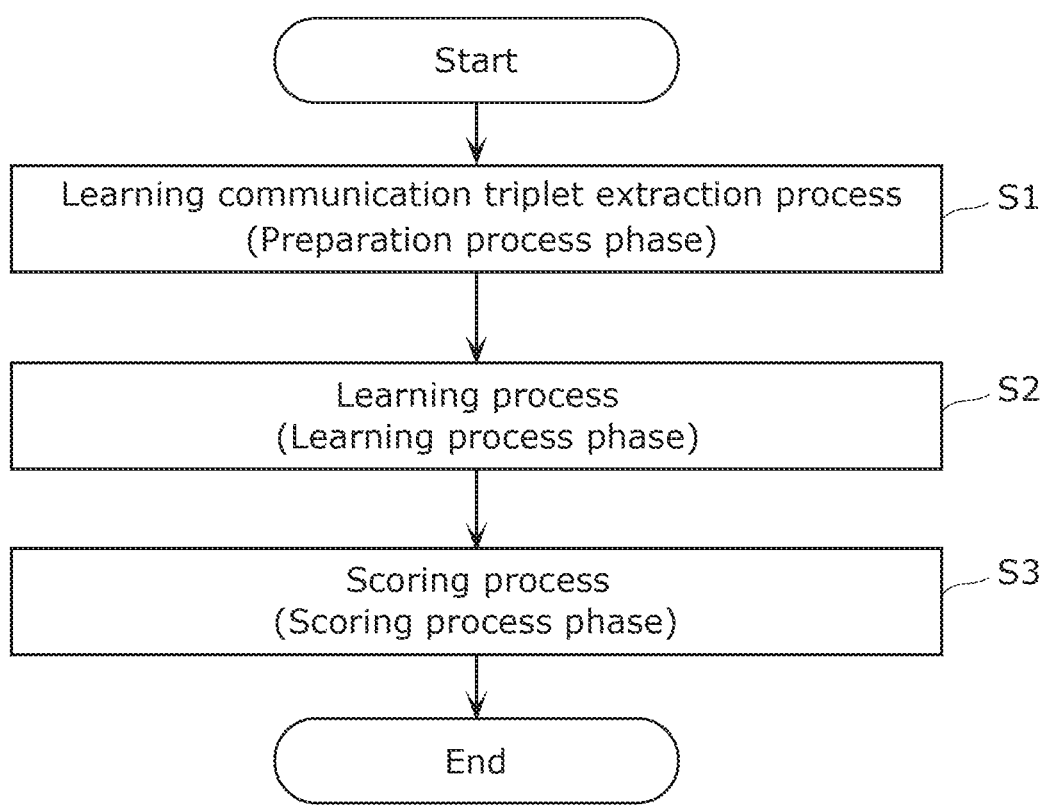

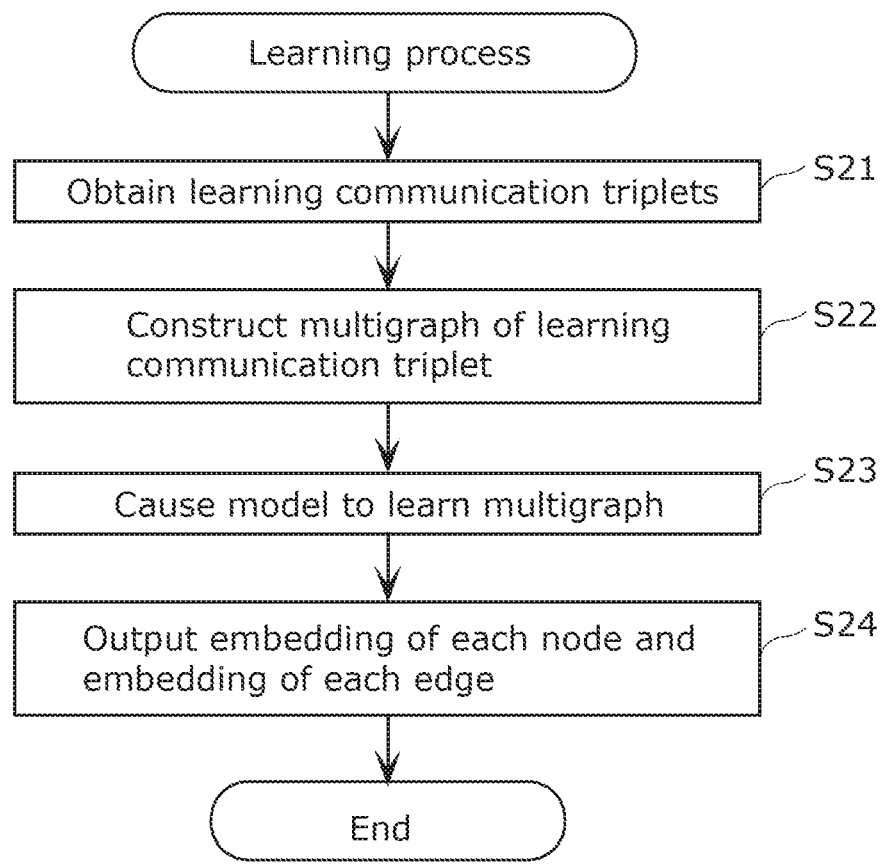

Algorithm 1 Communication triplet learning

Input: $V$: the set of observed IP addresses
  $\hat{\mathcal{E}}$: the set of trained triplets $(s,p,c)$
  R: the set of observed TCP/UDP port numbers

Output: $e_i \in R^d (i \in \{1,...,|V|\})$: the embeddings of IP addresses,
  $R_{p_j} \in R^{d \times d}(j \in \{1,...,|R|\})$: the embeddings of TCP/UPG port numbers 1: Learn $R_{p_i}(i \in \{1,...,|R|\})$ and $W_{p_j}^{(l)}$ ($j \in \{1,...,|R|\}$, l is the number of hidden layers) by minimizing the loss in equation (5)

2: Calculate $e_i \in R^d (i \in \{1,...,|V|\})$ by calculating forward-pass update in equation (3)

3: return $e_i(i \in \{1,...,|V|\}), R_{p_j}(i \in \{1,...,|R|\})$

Algorithm 2 Communication triplet scoring
Input: $(\tilde{s},\tilde{p},\tilde{c})$ : scoring target triplet,
  $V$: the set of observed IP addresses,
  $\hat{\mathcal{E}}$: the set of trained triplets (s,p,c)
  $R$: the set of observed TCP/UDP port numbers,
  $e_{p_i} \in R^d (i \in \{1,...,|V|\})$: the set of node embedding,
  $R_{p_i} \in R^{d \times d}(i \in \{1,...,|R|\})$: the set of relation embedding diagonal matrix
Output: score: the score of $(\tilde{s},\tilde{p},\tilde{c})$
  1: if $(\tilde{s},\tilde{p},\tilde{c}) \in \hat{\mathcal{E}}$ then
  2:   score = ∞
  3: else if $\tilde{s} \notin V$ or $\tilde{c} \notin V$ or $\tilde{p} \notin R$ then
  4:   score = -∞
  5: else
  6:   score = $e_{\tilde{s}}^T R_{\tilde{p}} e_{\tilde{c}}$
  7: end if
  8: return score

FIG. 15

|                      | Factory A | Factory B | Factory C |
|----------------------|-----------|-----------|-----------|
| # of IP addresses    | 364       | 150       | 4109      |
| # of TCP/UDP ports   | 319       | 26        | 328       |
| # of training triplets | 2241    | 2081      | 23993     |
| # of test triplets   | 764       | 558       | 4302      |

FIG. 16

| Model | Factory A | | | | Factory B | | | | Factory C | | | |
|---|---|---|---|---|---|---|---|---|---|---|---|---|
| | MRR | Hits@n | | | MRR | Hits@n | | | MRR | Hits@n | | |
| | | 1 | 3 | 10 | | 1 | 3 | 10 | | 1 | 3 | 10 |
| GCN SCOPE (proposed) | 0.240 | 0.172 | 0.238 | 0.366 | 0.210 | 0.108 | 0.222 | 0.395 | 0.291 | 0.167 | 0.423 | 0.504 |
| DistMult | 0.177 | 0.096 | 0.198 | 0.334 | 0.161 | 0.047 | 0.158 | 0.435 | 0.149 | 0.079 | 0.174 | 0.298 |
| 1st-order proximity priority method | 0.182 | 0.122 | 0.189 | 0.312 | 0.063 | 0.006 | 0.041 | 0.159 | 0.192 | 0.120 | 0.263 | 0.287 |
| 2nd-order proximity priority method | 0.168 | 0.101 | 0.179 | 0.277 | 0.055 | 0.009 | 0.031 | 0.116 | 0.151 | 0.056 | 0.244 | 0.286 |
| Random | 0.016 | 0.001 | 0.005 | 0.021 | 0.040 | 0.007 | 0.022 | 0.070 | 0.002 | 0.000 | 0.001 | 0.002 |

FIG. 17

| Model | Factory A | Factory B | Factory C |
|---|---|---|---|
| GCN SCOPE (proposed) | 0.962 | 0.914 | 0.996 |
| DistMult | 0.262 | 0.668 | 0.488 |
| 1st-order proximity priority method | 0.853 | 0.735 | 0.771 |
| 2nd-order proximity priority method | 0.820 | 0.632 | 0.769 |
| Random | 0.512 | 0.521 | 0.519 |

COMMUNICATION MONITORING METHOD AND COMMUNICATION MONITORING SYSTEM

CROSS REFERENCE TO RELATED APPLICATIONS

This is a continuation application of PCT International Application No. PCT/JP2021/025530 filed on Jul. 6, 2021, designating the United States of America, which is based on and claims priority of U.S. Provisional Patent Application No. 63/052,036 filed on Jul. 15, 2020 and Japanese Patent Application No. 2020-193196 filed on Nov. 20, 2020. The entire disclosures of the above-identified applications, including the specifications, drawings and claims are incorporated herein by reference in their entirety.

FIELD

The present disclosure relates to communication monitoring methods and communication monitoring systems.

BACKGROUND

There are industrial control systems (ICSs) for managing and controlling critical infrastructure such as electric power systems and water treatment systems.

Until recently, the ICSs were separated from corporate IT system networks and the Internet and were therefore safe from malware and cyberattacks.

However, recent years have seen an increase in demand for remotely monitoring or remotely operating critical infrastructure and managing big data collected from critical infrastructure. Therefore, more and more ICSs are connected to IT system networks or the Internet as a result of introduction of Internet of things (IoT) to the ICSs; in other words, more and more ICS networks are being built. Consequently, there is an increasing trend in the number of cases where the ICS networks are infected with malware or affected by cyberattacks.

Meanwhile, introducing a security product into a device on the ICS network is difficult; therefore, network-based security measures are predominant in the ICSs. In the ICSs, among the network-based security measures, particularly, an anomaly detection method that uses a whitelist is said to be effective and is thus often used (for example, refer to Non Patent Literature (NPLs) 1 and 2). For example, the whitelist includes 3-tuples including the IP address of a server, the TCP/UDP port number, and the IP address of a client (hereinafter referred to as a communication triplet). When a communication triplet that is not included in the whitelist is observed, an alert is issued; in this manner, security measures for the ICSs can be implemented.

CITATION LIST

Non Patent Literature

NPL 1: R. R. R. Barbosa, R. Sadre, and A. Pras, "Flow whitelisting in SCADA networks," International Journal of Critical Infrastructure Protection (IJCIP), vol. 6, no. 3-4, 2013.

NPL 2: K. Stouffer, J. Falco, and K. Scarfone, "Guide to industrial control systems ICS security," NIST special publication, vol. 800, no. 82, 2011.

NPL 3: Paxson, V., Campbell, S., & Lee, J. (2006). Bro intrusion detection system (No. Bro; 001905IBMPC00). Lawrence Berkeley National Laboratory.

NPL 4: B. Yang, W. Yih, X. He, J. Gao, and L. Deng, "Embedding entities and relations for learning and inference in knowledge bases," in Proc. of International Conference on Learning Representations (ICLR), 2015.

NPL 5: M. S. Schlichtkrull, T. N. Kipf, P. Bloem, R. van den Berg, I. Titov, and M. Welling, "Modeling relational data with graph convolutional networks," in Proc. of Extended Semantic Web Conference (ESWC), 2018.

NPL 6: Shikhar Vashishth, Soumya Sanyal, Vikram Nitin, Partha Talukdar, "Composition-based Multi-Relational Graph Convolutional Networks" ICLR 2020 Conference Blind Submission.

NPL 7: T. Dettmers, P. Minervini, P. Stenetorp, and S. Riedel, "Convolutional 2d knowledge graph embeddings," in Proc. of Association for the Advancement of Artificial Intelligence (AAAI), 2018.

NPL 8: A. Bordes, N. Usunier, A. Garcia-Duran, J. Weston, and O. Yakhnenko, "Translating embeddings for modeling multi-relational data," in Proc. of Conference and Workshop on Neural Information Processing Systems (NIPS), 2013.

NPL 9: Nickel, Maximilian, Rosasco, Lorenzo, and Poggio, Tomaso A. Holographic embeddings of knowledge graphs. In Proceedings of the Thirtieth AAAI Conference on Artificial Intelligence, pp. 1955-1961, 2016b.

NPL 10: Theo Trouillon, Johannes Welbl, Sebastian Riedel, Eric Gaussier, Guillaume Bouchard, "Complex Embeddings for Simple Link Prediction" ICML'16: Proceedings of the 33rd International Conference on International Conference on Machine Learning—Volume 48 June 2016 Pages 2071-2080.

SUMMARY

Technical Problem

In the anomaly detection methods disclosed in NPLs 1 and 2, normal communication triplets are held as a whitelist, and a communication triplet that is not included in the whitelist is detected as an anomalous triplet; these methods are problematic in that false detection occurs frequently. Security operators need to analyze whether a detected anomalous communication triplet, due to which an alert has been issued, is important in terms of security, for example, whether the detected anomalous communication triplet exposes the ICS network to malware infection or cyberattacks. Therefore, the security operators are forced to deal with a large number of false alerts. In other words, the anomaly detection methods disclosed in NPLs 1 and 2 impose heavy analysis burdens on the security operators for the ICS network, and thus it is impractical to apply these methods.

The present disclosure is conceived in view of the above-described circumstances and has an object to provide a communication monitoring method and a communication monitoring system in which false detections of network communication can be reduced.

Solution to Problem

In order to solve the aforementioned problems, a communication monitoring method according to one aspect of the present disclosure is a communication monitoring method for monitoring communication in a network and includes: extracting, from the communication, a first communication triplet that is a 3-tuple including information indicating a source device, information indicating a destination device, and information indicating a type of communication performed between devices; determining whether the first communication triplet extracted corresponds to any of a plurality of second communication triplets stored in storage in advance as a whitelist and each being a 3-tuple including information indicating a source device, information indicating a destination device, and information indicating a type of communication; and estimating, as a score, a possibility that the first communication triplet emerges as the communication, by using a model that has been trained, and outputting the score when the first communication triplet does not correspond to any of the plurality of second communication triplets.

Note that the aforementioned general or specific aspects may be implemented using a system, a method, an integrated circuit, a computer program, or a computer-readable recording medium such as a compact disc read-only memory (CD-ROM), or any combination of systems, methods, integrated circuits, computer programs, and recording media.

Advantageous Effects

According to the present disclosure, it is possible to provide a communication monitoring method, etc., in which false detections of network communication can be reduced.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 4 is a diagram illustrating one example of a communication triplet according to an embodiment.

FIG. 5 is a diagram illustrating one example of a communication triplet according to an embodiment.

FIG. 6A is one example of a whitelist according to an embodiment.

FIG. 6B is a diagram illustrating a multigraph of a whitelist according to an embodiment.

FIG. 6C is a diagram illustrating one example of the result of a scoring process of a communication triplet to be monitored according to an embodiment.

FIG. 9 is a flowchart illustrating the outline of operation of a communication monitoring system according to an embodiment.

FIG. 11 is a flowchart illustrating details of the learning process illustrated in FIG. 9.

FIG. 12 is a diagram illustrating algorithm 1 for performing the learning process illustrated in FIG. 11.

FIG. 14 is a diagram illustrating algorithm 2 for performing the scoring process illustrated in FIG. 13.

FIG. 15 is a diagram illustrating the nature of a dataset according to a working example.

FIG. 16 is a diagram illustrating the evaluation result of link prediction in which test communication triplets according to a working example are used for prediction.

FIG. 17 is a diagram illustrating evaluation of link distinguishing ability based on scores that have been output using test communication triplets according to a working example.

DESCRIPTION OF EMBODIMENTS

Figure 1:
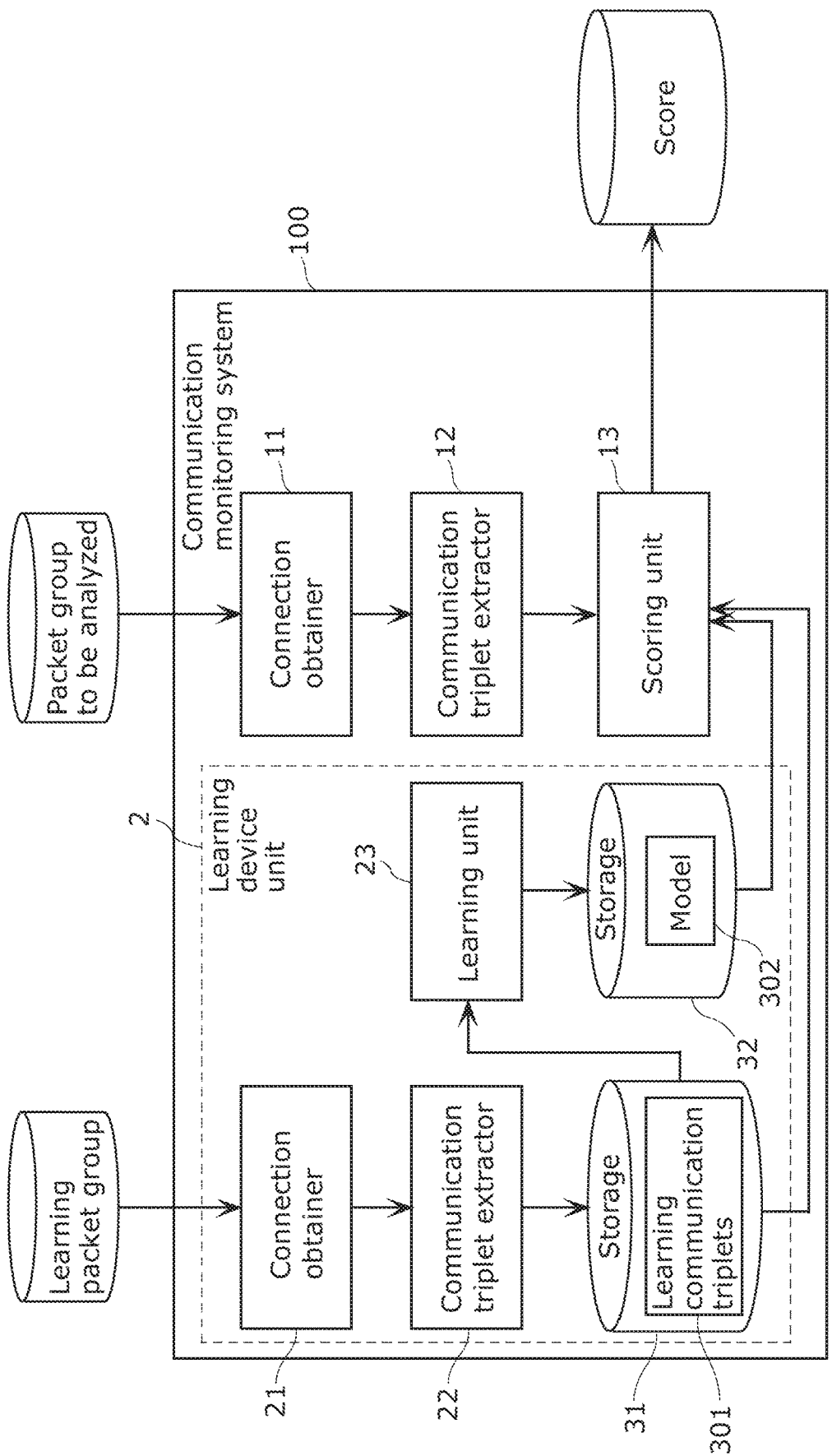
FIG. 1 is a block diagram illustrating one example of the configuration of a communication monitoring system according to an embodiment.

A communication monitoring method according to one aspect of the present disclosure is a communication monitoring method for monitoring communication in a network and includes: extracting, from the communication, a first communication triplet that is a 3-tuple including information indicating a source device, information indicating a destination device, and information indicating a type of communication performed between devices; determining whether the first communication triplet extracted corresponds to any of a plurality of second communication triplets stored in storage in advance as a whitelist and each being a 3-tuple including information indicating a source device, information indicating a destination device, and information indicating a type of communication; and estimating, as a score, a possibility that the first communication triplet emerges as the communication, by using a model that has been trained, and outputting the score when the first communication triplet does not correspond to any of the plurality of second communication triplets.

With this, when the possibility of the emergence of a communication triplet that is not included in the whitelist is quantified as a score, it is possible to narrow down to important communication triplets to be analyzed from the perspective of security. Thus, false detections of network communication can be reduced.

Furthermore, for example, in the outputting, when the score is less than or equal to a threshold value, a monitoring result indicating that the communication is suspicious may be output.

With this, false detections of network communication can be reduced.

Furthermore, for example, the estimating of the score may include causing the model that has been trained to perform the following: converting a set of 3-tuples of the first communication triplet into a multigraph in which the information indicating the source device and the information indicating the destination device are nodes and the information indicating the type of communication is a type of an edge, and mapping each of the nodes of the multigraph to vector representation of a fixed dimension to obtain vector representation of each element of the first communication triplet; and estimating the score from the vector representation of the first communication triplet obtained.

This allows accurate score estimation for a communication triplet that is not included in the whitelist.

Here, for example, the model may include a relational graph convolutional network (R-GCN).

Furthermore, for example, the estimating of the score may include causing the model that has been trained to perform the following: converting a set of 3-tuples of the first communication triplet into a multigraph in which the information indicating the source device and the information indicating the destination device are nodes and the information indicating the type of communication is a type of an edge, and obtaining vector representation of the first communication triplet from the multigraph; and estimating the score using a link prediction algorithm from the vector representation of the first communication triplet obtained.

This allows accurate score estimation for a communication triplet that is not included in the whitelist.

Here, for example, the model may include a composition-based multi-relational graph convolutional network (COMPGCN).

Furthermore, for example, the estimating of the score may include causing the model that has been trained to perform the following: obtaining vector representation of the first communication triplet from a set of 3-tuples of the first communication triplet; and estimating the score using a link prediction algorithm from the vector representation of the first communication triplet obtained.

This allows accurate score estimation for a communication triplet that is not included in the whitelist.

Here, for example, the model may include any of DistMult, convolutional 2D knowledge graph embeddings (convE), translating embeddings for modeling multi-relational data (TransE), holographic embeddings of knowledge graphs (HolE), and complex embeddings for simple link prediction (ComplEx).

Furthermore, for example, the information indicating the source device may be an IP address of a server that is the source device, the information indicating the destination device may be an IP address of a client that is the destination device, and the information indicating the type of communication may include a TCP/UDP port number or a type of an alert.

With this, the possibility of the emergence of a communication triplet that is not included in the whitelist can be handled as the link prediction problem in multigraphs, and thus it is possible to estimate the score of the communication triplet that is not included in the whitelist.

Furthermore, for example, the information indicating the source device may be a MAC address or a serial number of the source device, the information indicating the destination device may be a MAC address or a serial number of the destination device, and the information indicating the type of communication may include a type of an alert or a type of a communication command that is exchanged between the source device and the destination device.

With this, the possibility of the emergence of a communication triplet that is not included in the whitelist can be handled as the link prediction problem in multigraphs, and thus it is possible to estimate the score of the communication triplet that is not included in the whitelist.

Furthermore, for example, the communication monitoring method may further include: before the extracting, obtaining the plurality of second communication triplets from network communication performed in a predetermined period; and performing a learning process using, as data for learning, the plurality of second communication triplets obtained, the learning process including causing the model to obtain vector representation of the plurality of second communication triplets and estimate, as a score, a possibility that the network communication performed in the predetermined period emerges.

Furthermore, for example, the communication monitoring method may further include: before the extracting, obtaining the plurality of second communication triplets from network communication performed in a predetermined period; performing a learning process using, as data for learning, the plurality of second communication triplets obtained, the learning process including causing the model to obtain vector representation of the plurality of second communication triplets and estimate, as a score, a possibility that the network communication performed in the predetermined period emerges; and estimating, as a score indicating an anomaly level, a possibility that each of the plurality of second communication triplets obtained emerges as the communication, by using the model that has been trained, and outputting the score.

With this, the score indicating the anomaly level of each of the second communication triplets can be checked, and thus it is possible to check whether any of the second communication triplets obtained from network communication performed in the predetermined period as a learning period and used as the data for learning is anomalous.

Furthermore, for example, in the learning process of causing the model to obtain the vector representation of the plurality of second communication triplets, a multigraph in which the information indicating the source device and the information indicating the destination device are nodes and the information indicating the type of communication is a type of an edge may be constructed from a set of 3-tuples of the plurality of second communication triplets, and the multigraph constructed may be input to the model, and training may be conducted by causing the model to map each of the nodes of the multigraph to vector representation of a fixed dimension and obtain the vector representation of the plurality of second communication triplets.

Furthermore, for example, in the plurality of second communication triplets that are used as the data for learning, in addition to the type of communication, a feature amount regarding the network communication performed in the predetermined period may be included as the type of communication.

With this, the vector representation obtained by the model has increased accuracy, and the score estimated by the trained model has increased accuracy.

Furthermore, for example, the feature amount includes at least one of an amount of communication per unit time or a median communication time interval in the network communication performed in the predetermined period.

Furthermore, for example, the communication monitoring method may further include: before the extracting, obtaining, from network communication performed in a predetermined period, a plurality of third communication triplets each being a 3-tuple including information indicating a source device, information indicating a destination device, and information indicating a type of communication; performing a learning process using, as data for learning, the plurality of third communication triplets obtained, the learning process including causing the model to obtain vector representation of the plurality of third communication triplets and estimate, as a score, a possibility that the network communication performed in the predetermined period emerges; estimating, as a score indicating an anomaly level, a possibility that each of the plurality of third communication triplets emerges as the communication, by using the model that has been trained, and outputting the score; and storing communication triplets obtained by excluding one or more third communication triplets from the plurality of third communication triplets based on the score indicating the anomaly level into the storage as the plurality of second communication triplets.

With this, the third communication triplets obtained by excluding anomalous third communication triplets, using the estimated score indicating the anomaly level, from the plurality of third communication triplets obtained from the network communication performed in the predetermined period as a learning period can be stored as a whitelist (the plurality of second communication triplets).

Furthermore, for example, the communication monitoring method may further include: before the extracting, obtaining, from network communication performed in a predetermined period, a plurality of third communication triplets each being a 3-tuple including information indicating a source device, information indicating a destination device, and information indicating a type of communication; performing a learning process using, as data for learning, the plurality of third communication triplets obtained, the learning process including causing the model to obtain vector representation of the plurality of third communication triplets and estimate, as a score, a possibility that the network communication performed in the predetermined period emerges; estimating, as a score indicating an anomaly level, a possibility that each of the plurality of third communication triplets emerges as the communication, by using the model that has been trained, and outputting the score; performing a re-learning process using, as data for re-learning, communication triplets obtained by excluding one or more third communication triplets from the plurality of third communication triplets based on the score, the re-learning process including causing the model to obtain vector representation of the plurality of third communication triplets and estimate, as a score, a possibility that the network communication performed in the predetermined period emerges; and storing communication triplets obtained by excluding one or more third communication triplets from the plurality of third communication triplets based on the score indicating the anomaly level into the storage as the plurality of second communication triplets.

With this, the third communication triplets obtained by excluding anomalous third communication triplets, using the estimated score indicating the anomaly level, from the plurality of third communication triplets obtained from the network communication performed in the predetermined period as a learning period can be stored as a whitelist (the plurality of second communication triplets). Furthermore, the model can be re-trained using, as data for re-learning, the third communication triplets obtained by excluding anomalous third communication triplets from the plurality of third communication triplets. Moreover, the use of the re-trained model can minimize the risk of overlooking an anomalous communication triplet at the time of the scoring process.

Furthermore, for example, in the learning process or the re-learning process, a multigraph in which the information indicating the source device and the information indicating the destination device are nodes and the information indicating the type of communication is a type of an edge is constructed from a set of 3-tuples of the plurality of third communication triplets, and the multigraph constructed is input to the model, and training is conducted by causing the model to map each of the nodes of the multigraph to vector representation of a fixed dimension and obtain vector representation of the plurality of second communication triplets.

A communication monitoring system according to one aspect of the present disclosure is a communication monitoring system for monitoring communication in a network and includes: an extractor that extracts, from the communication, a first communication triplet being a 3-tuple including information indicating a source device, information indicating a destination device, and information indicating a type of communication performed between devices; storage in which a plurality of second communication triplets each being a 3-tuple including information indicating a source device, information indicating a destination device, and information indicating a type of communication are stored as a whitelist; and a scoring unit that determines whether the first communication triplet extracted corresponds to any of the plurality of second communication triplets and when the first communication triplet does not correspond to any of the plurality of second communication triplets, estimates, as a score, a possibility that the first communication triplet emerges as the communication, by using a model that has been trained, and outputs the score.

Each embodiment described below shows a specific example of the present disclosure. Thus, the numerical values, shapes, materials, structural elements, the arrangement and connection of the structural elements, etc., shown in the following embodiment are mere examples, and are not intended to limit the present disclosure. Among the structural elements in the following embodiment, structural elements not recited in any one of the independent claims which indicates a form of implementation according to one embodiment of the present disclosure will be described as arbitrary structural elements. The form of implementation of the present disclosure is not limited to the original independent claims and may be expressed by other independent claims.

Embodiment

Hereinafter, an embodiment will be described with reference to the drawings.

1. Communication Monitoring System 100

FIG. 1 is a block diagram illustrating one example of the configuration of communication monitoring system 100 according to the present embodiment.

Communication monitoring system 100, which is provided as a computer or the like, performs a scoring process on a communication triplet included in a packet to be analyzed, on the basis of information such as a communication triplet included in a learning packet group, and outputs an estimated score. The score herein indicates quantitative representation of the possibility (naturalness) that said communication triplet emerges as network communication.

In the present embodiment, communication monitoring system 100 includes connection obtainer 11, communication triplet extractor 12, scoring unit 13, connection obtainer 21, communication triplet extractor 22, leaning unit 23, storage 31, and storage 32, as illustrated in FIG. 1. Note that connection obtainer 21, communication triplet extractor 22, leaning unit 23, storage 31, and storage 32 constitute learning device unit 2, as illustrated in FIG. 1. Connection obtainer 11, communication triplet extractor 12, and scoring unit 13 constitute communication monitoring device 1 illustrated in FIG. 2. Hereinafter, first, communication monitoring device 1 will be described.

1.1 Communication Monitoring Device 1

Figure 2:
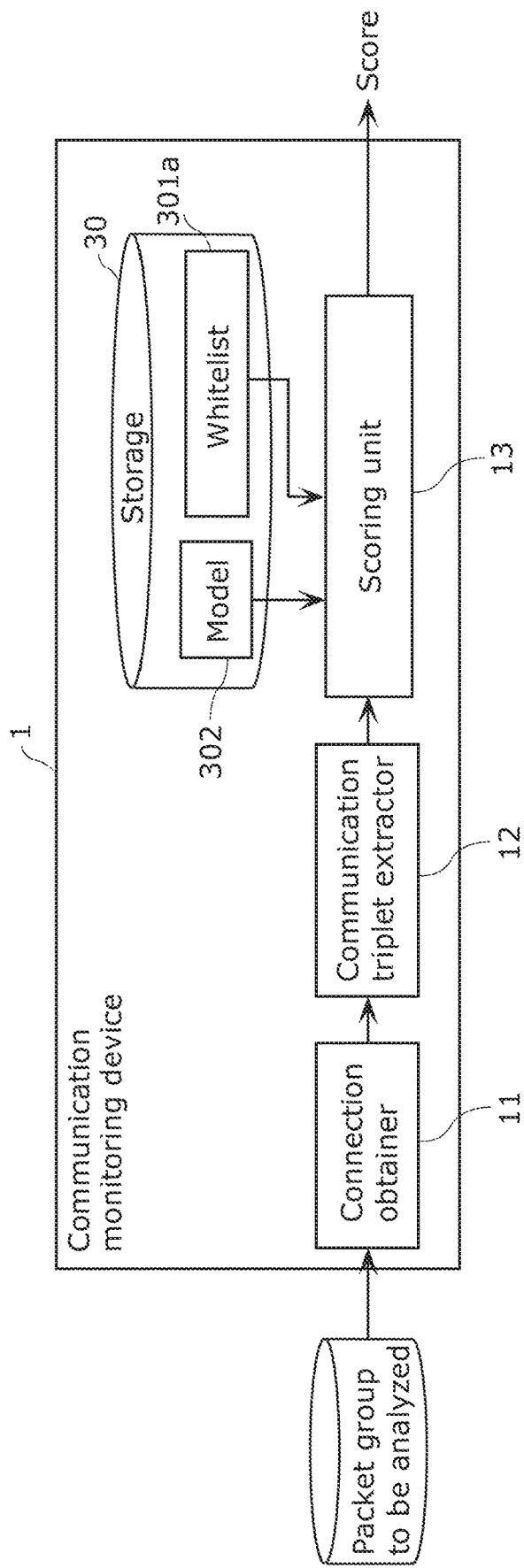
FIG. 2 is a block diagram illustrating one example of the configuration of a communication monitoring device according to an embodiment.

FIG. 2 is a block diagram illustrating one example of the configuration of communication monitoring device 1 according to the present embodiment.

Figure 3:
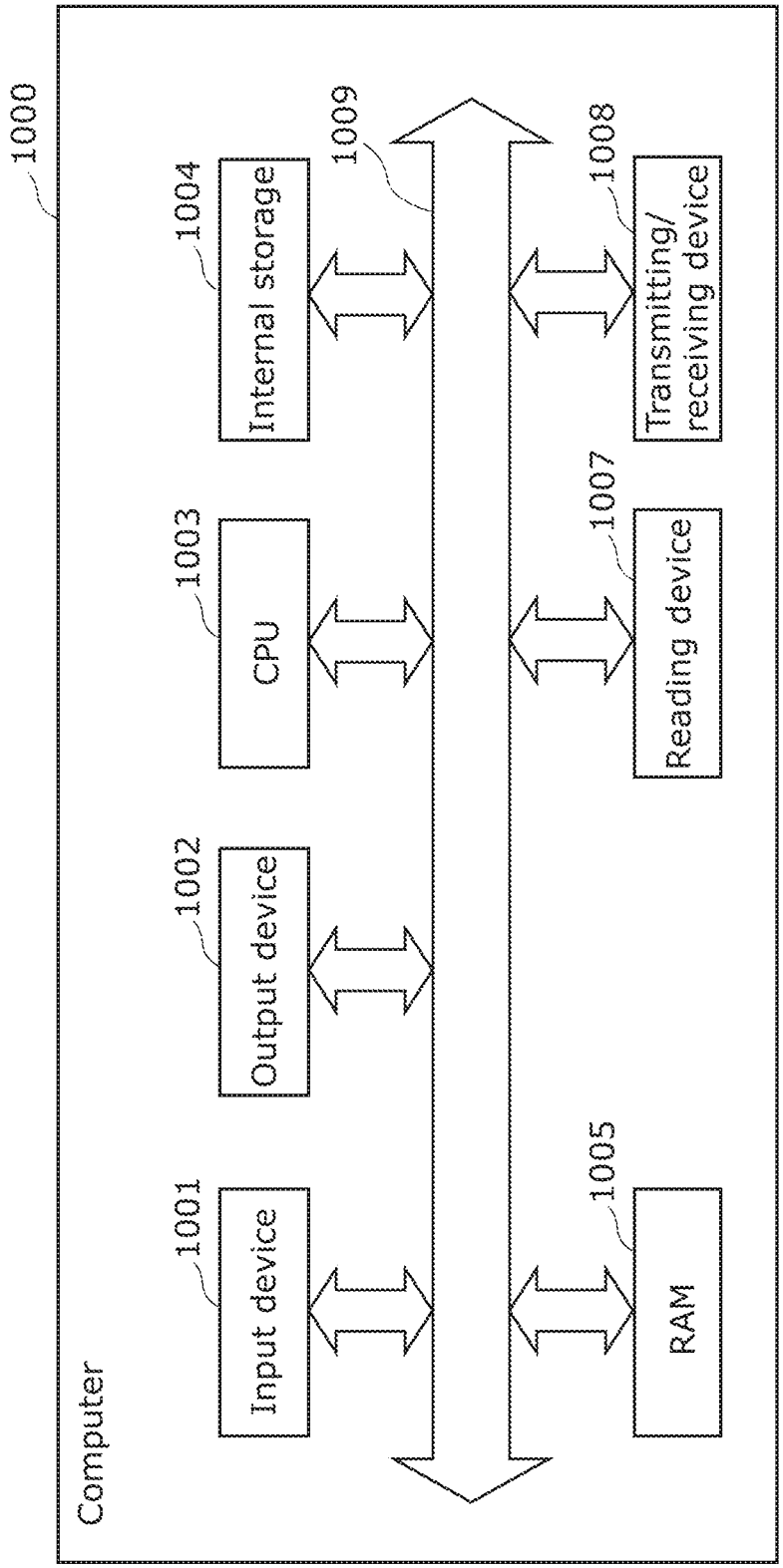
FIG. 3 is a diagram illustrating one example of the hardware configuration of a computer that implements, using software, the functions of a communication monitoring device according to an embodiment.

Communication monitoring device 1, which is provided as computer 1000 or the like illustrated in FIG. 3, monitors network communication.

1.2 Hardware Configuration of Communication Monitoring Device 1

FIG. 3 is a diagram illustrating one example of the hardware configuration of computer 1000 that implements, using software, the functions of communication monitoring device 1 according to the present embodiment.

Computer 1000 illustrated in FIG. 3 includes input device 1001, output device 1002, CPU 1003, internal storage 1004, RAM 1005, reading device 1007, transmitting/receiving device 1008, and bus 1009. Input device 1001, output device 1002, CPU 1003, internal storage 1004, RAM 1005, reading device 1007, and transmitting/receiving device 1008 are connected by bus 1009.

Input device 1001, which is a device serving as a user interface such as an input button, a touchpad, and a touch panel display, receives user input. Note that input device 1001 may be configured to not only receive user touch input, but also receive voice control and a remote operation using a remote control or the like. Internal storage 1004 is a flash memory or the like. At least one of a program for implementing the functions of communication monitoring device 1 and an application in which the functional configuration of communication monitoring device 1 is used may be stored in internal storage 1004 in advance.

RAM 1005, which is a random-access memory, is used to store data, etc., at the time of execution of the program or the application.

Reading device 1007 reads information from a recording medium such as a universal serial bus (USB) memory. Reading device 1007 reads the aforementioned program, application, etc., from a recording medium on which said program, application, etc., are recorded, and stores the read program, application, etc., into internal storage 1004.

Transmitting/receiving device 1008 is a communication circuit for performing wired or wireless communication. For example, transmitting/receiving device 1008 may communicate with a cloud storage, a server device, etc., connected to a network, download the aforementioned program, application, etc., and store the program, application, etc., into internal storage 1004.

CPU 1003, which is a central processing unit, copies the program, application, etc., stored in internal storage 1004 onto RAM 1005, sequentially reads commands included in said program, application, etc., from RAM 1005, and executes the read commands.

1.3 Configuration of Communication Monitoring Device 1

Communication monitoring device 1 includes connection obtainer 11, communication triplet extractor 12, scoring unit 13, and storage 30, as illustrated in FIG. 2. Hereinafter, these structural elements will be described.

[1.3.1 Connection Obtainer 11]

Connection obtainer 11 obtains connection information from network communication.

In the example illustrated in FIG. 2, connection obtainer 11 obtains connection information from a packet group to be analyzed in network communication. The connection information herein is information regarding a dedicated virtual communication path formed between software products or devices that perform communication. The connection information is, for example, information indicating from which node (device) to which node (device) a connection is established and what port is used to establish the connection.

Connection obtainer 11 may use the technique disclosed in NPL 3, for example; by obtaining a file called "conn.log", it is possible to obtain the connection information.

[1.3.2 Communication Triplet Extractor 12]

Communication triplet extractor 12 extracts, from network communication, a first communication triplet that is a 3-tuple including information indicating a source device, information indicating a destination device, and information indicating the type of communication performed between the devices.

In the example illustrated in FIG. 2, communication triplet extractor 12 extracts a communication triplet as the first communication triplet from the connection information obtained by connection obtainer 11.

FIG. 4 and FIG. 5 are diagrams each illustrating one example of a communication triplet according to the present embodiment.

The communication triplet, which is observed in communication in the ICS network to be monitored, is a 3-tuple including the IP address of a server, the TCP/UDP port number, and the IP address of a client, as illustrated in FIG. 4, for example. Note that the communication triplet is not limited to having the exemplary configuration illustrated in FIG. 4 and may be configured to include the type of an alert as illustrated in FIG. 5.

Specifically, the information indicating a source device is the IP address of a server that is the source device, the information indicating a destination device is the IP address of a client that is the destination device, and the information indicating the type of communication may include the TCP/UDP port number or the type of an alert.

Furthermore, the communication triplet is not limited to having a configuration resulting from combinations of the examples illustrated in FIG. 4 and FIG. 5. Information that specifies a device, such as an MAC address or a device serial number, and the protocol name or the category of information that is exchanged between devices, for example, the type of a communication command to be used, such as write or read, may be combined. Specifically, in the communication triplet, the information indicating a source device may be the MAC address or the serial number of the source device, and the information indicating a destination device may be the MAC address or the serial number of the destination device. The information indicating the type of communication may include the type of an alert or the type of a communication command that is exchanged between the source device and the destination device.

[1.3.3 Storage 30]

Storage 30 includes, for example, a rewritable non-volatile memory such as a hard disk drive or a solid-state drive.

In storage 30, a plurality of second communication triplets are stored in advance as a whitelist. Each of the plurality of second communication triplets herein is a 3-tuple including information indicating a source device, information indicating a destination device, and information indicating the type of communication.

In the present embodiment, whitelist 301a and trained model 302 are stored in storage 30. Whitelist 301a holds the plurality of second communication triplets (the plurality of communication triplets) that are the same as learning communication triplets 301 illustrated in FIG. 1. Trained model 302 is the same as model 302 trained by learning unit 23 illustrated in FIG. 1.

Note that storage 30 is storage 31 and storage 32 that are separate in the example illustrated in FIG. 2, but may be configured to include storage 31 and storage 32.

[1.3.4 Scoring Unit 13]

Scoring unit 13 performs a scoring process on communication that is not included in whitelist 301a. Specifically, scoring unit 13 determines whether the first communication triplet extracted corresponds to any of the plurality of second communication triplets stored in storage 30 as the whitelist. Furthermore, when the first communication triplet does not correspond to any of the plurality of second communication triplets, scoring unit 13 estimates, using trained model 302, a score indicating the possibility that the first communication triplet emerges as communication, and outputs the score.

When the score is less than or equal to a threshold value, scoring unit 13 may output a monitoring result indicating that said communication is suspicious. Model 302 includes a relational graph convolutional network (R-GCN), for example.

In the present embodiment, scoring unit 13 determines whether the communication triplet extracted by communication triplet extractor 12 is included in whitelist 301a.

When the communication triplet extracted by communication triplet extractor 12 is included in whitelist 301a, scoring unit 13 may preclude the extracted communication triplet from the subjects of the scoring process and skip the scoring process. This is because when the extracted communication triplet is included in whitelist 301a, it is possible to determine that the communication of the extracted communication triplet is normal (not suspicious). Note that when the extracted communication triplet is included in whitelist 301a, scoring unit 13 may output, as a monitoring result, a score indicating that the communication of the extracted communication triplet is normal (not suspicious).

On the other hand, when the extracted communication triplet is not included in whitelist 301a, scoring unit 13 performs the scoring process on the extracted communication triplet using trained model 302. Scoring unit 13 outputs the score of the extracted communication triplet, that is, a score indicating the estimated possibility that the extracted communication triplet emerges as communication.

Note that, furthermore, when any element of the 3-tuple of the extracted communication triplet is observed for the first time, that is, when any element of the 3-tuple of the extracted communication triplet is not included in whitelist 301a, scoring unit 13 may preclude the extracted communication triplet from the subjects of the scoring process. In this case, scoring unit 13 may output, as a monitoring result, a score indicating that the communication of said communication triplet is suspicious or may output a report indicating that the communication of said communication triplet is suspicious.

Hereinafter, the details (internal processing) of the scoring process performed on the extracted communication triplet will be described.

Specifically, by inputting the elements included in the communication triplet to be monitored to trained model 302, scoring unit 13 causes trained model 302 to obtain the vector representation of the elements of the communication triplet to be monitored. Subsequently, scoring unit 13 causes trained model 302 to estimate a score from the obtained vector representation of the communication triplet to be monitored, and outputs the score.

Next, one example of the scoring process performed on the extracted communication triplet, namely, the communication triplet to be monitored, will be described with reference to the drawings.

FIG. 6A is one example of whitelist 301a according to the present embodiment. FIG. 6B is a diagram illustrating a multigraph of whitelist 301a according to the present embodiment. FIG. 6C is a diagram illustrating one example of the result of the scoring process of the communication triplet to be monitored according to the present embodiment.

In the example illustrated in FIG. 6A, whitelist 301a includes four communication triplets each of which is a 3-tuple including a source device, the type of communication, and a destination device. In this case, trained model 302 includes information obtained by converting the four communication triplets included in whitelist 301a into the multigraph illustrated in FIG. 6B and then mapping each of the nodes of said multigraph to the vector representation of the fixed dimension. In other words, trained model 302 includes the information of the multigraph structure illustrated in FIG. 6B in which A, B, C, and D are nodes that are the source device and the destination device indicated in FIG. 6A and HTTP, SMB, and MSSQL, which are the type of communication, are the types of edges. Furthermore, trained model 302 includes the information in which each of the nodes of the multigraph illustrated in FIG. 6B is mapped to the vector representation of the fixed dimension.

Assume, for example, that the 3-tuple of the communication triplet to be monitored (to be analyzed) includes A, MSSQL, and D. In this case, using trained model 302, scoring unit 13 adds an edge indicating MSSQL to node A and node C of the multigraph illustrated in FIG. 6B, as illustrated in FIG. 6C. Furthermore, scoring unit 13 causes trained model 302 to estimate, as the score of the communication triplet to be monitored, the possibility that the edge connecting node A and node C and indicating MSSQL emerges as communication. In the example illustrated in FIG. 6C, the score of the communication triplet to be monitored is 1.3. Note that the greater the score, the more likely the communication is normal (not suspicious); thus, when the score is less than or equal to the threshold value, it can be determined that the communication is anomalous (suspicious). The threshold value can be 0, for example. In the example illustrated in FIG. 6C, the score is 1.3, which is greater than the threshold value, meaning that the communication of the communication triplet to be monitored is determined as being normal (not suspicious).

1.4 Configuration of Learning Device Unit 2

Next, learning device unit 2 will be described.

Learning device unit 2 includes connection obtainer 21, communication triplet extractor 22, learning unit 23, storage 31, and storage 32, as mentioned above.

[1.4.1 Connection Obtainer 2]

Connection obtainer 21 obtains connection information from network communication. In the example illustrated in FIG. 1, connection obtainer 21 obtains connection information from a learning packet group in network communication. A method in which connection obtainer 21 obtains the connection information is as described above with connection obtainer 11; thus, the description will not be repeated.

[1.4.2 Communication Triplet Extractor 22]

Communication triplet extractor 22 obtains the second communication triplet from network communication performed in a predetermined period. In the example illustrated in FIG. 1, communication triplet extractor 22 extracts a communication triplet from the connection information obtained by connection obtainer 21 and stores the communication triplet into storage 31 as learning communication triplet 301.

When the extracted communication triplet is found stored (already observed) as learning communication triplet 301, communication triplet extractor 22 does not add the communication triplet to learning communication triplet 301. In other words, when the extracted communication triplet is not found stored (not already observed) as learning communication triplet 301, communication triplet extractor 22 adds the communication triplet to learning communication triplet 301; thus, learning communication triplet 301 is obtained.

[1.4.3 Storage 31]

Storage 31, which includes, for example, a rewritable non-volatile memory such as a hard disk drive or a solid-state drive, stores learning communication triplet 301. Note that learning communication triplet 301 is used as whitelist 301a in scoring unit 13, as described above.

[1.4.4 Storage 32]

Storage 32, which includes, for example, a rewritable non-volatile memory such as a hard disk drive or a solid-state drive, stores model 302. Model 302 includes, for example, a R-GCN, as described above. Model 302 is learned in the learning process by learning unit 23.

[1.4.5 Learning Unit 23]

Using learning communication triplet 301 that is stored in storage 31, learning unit 23 performs the learning process on model 302 stored in storage 32. Subsequently, learning unit 23 updates model 302 stored in storage 32 to trained model 302.

In the present embodiment, using the second communication triplet as data for learning, learning unit 23 performs the learning process of causing model 302 to obtain the vector representation of the second communication triplet and estimate, as a score, the possibility that network communication performed in a predetermined period emerges.

Learning unit 23 constructs, from a set of 3-tuples of the second communication triplet, a multigraph in which the information indicating the source device and the information indicating the destination device are nodes and the information indicating the type of communication is the type of an edge. Learning unit 23 inputs the constructed multigraph to model 302 and thereby conducts training by causing model 302 to map each of the nodes of said multigraph to the vector representation of the fixed dimension and obtain the vector representation of the second communication triplet.

Note that the second communication triplet used as the data for learning may include a feature amount regarding network communication performed in the predetermined period as the type of communication, in addition to said type of communication. This feature amount may include at least one of the amount of communication per unit time and the median communication time interval in the network communication performed in the predetermined period. With this, learning unit 23 enables the vector representation that is obtained by model 302 to have increased accuracy and enables the score that is estimated by trained model 302 to have increased accuracy.

2. Exemplary Process, Etc., of Communication Monitoring System 100

Next, an exemplary process, etc., of communication monitoring system 100 which includes the elements of communication monitoring device 1 and learning device unit 2 configured as described above will be described.

Figure 7:
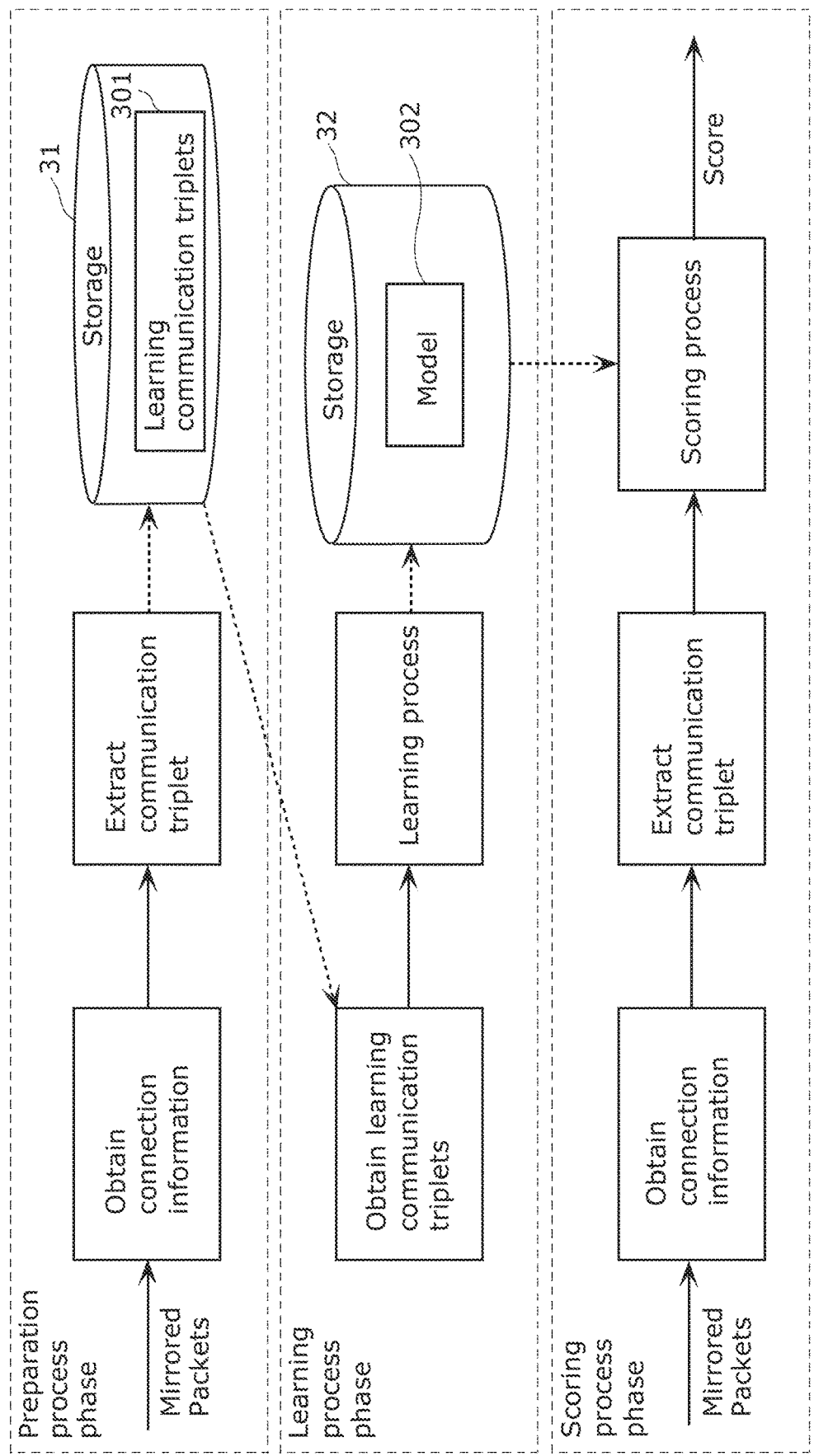
FIG. 7 is a diagram illustrating a framework for the process of a communication monitoring system according to an embodiment.

FIG. 7 is a diagram illustrating a framework for the process of communication monitoring system 100 according to the present embodiment. Elements that are substantially the same as those in FIG. 1 and FIG. 2 are assigned the same reference signs. As illustrated in FIG. 7, the process of communication monitoring system 100 can be divided into a preparation process phase, a learning process phase, and a scoring process phase.

Figure 8A:
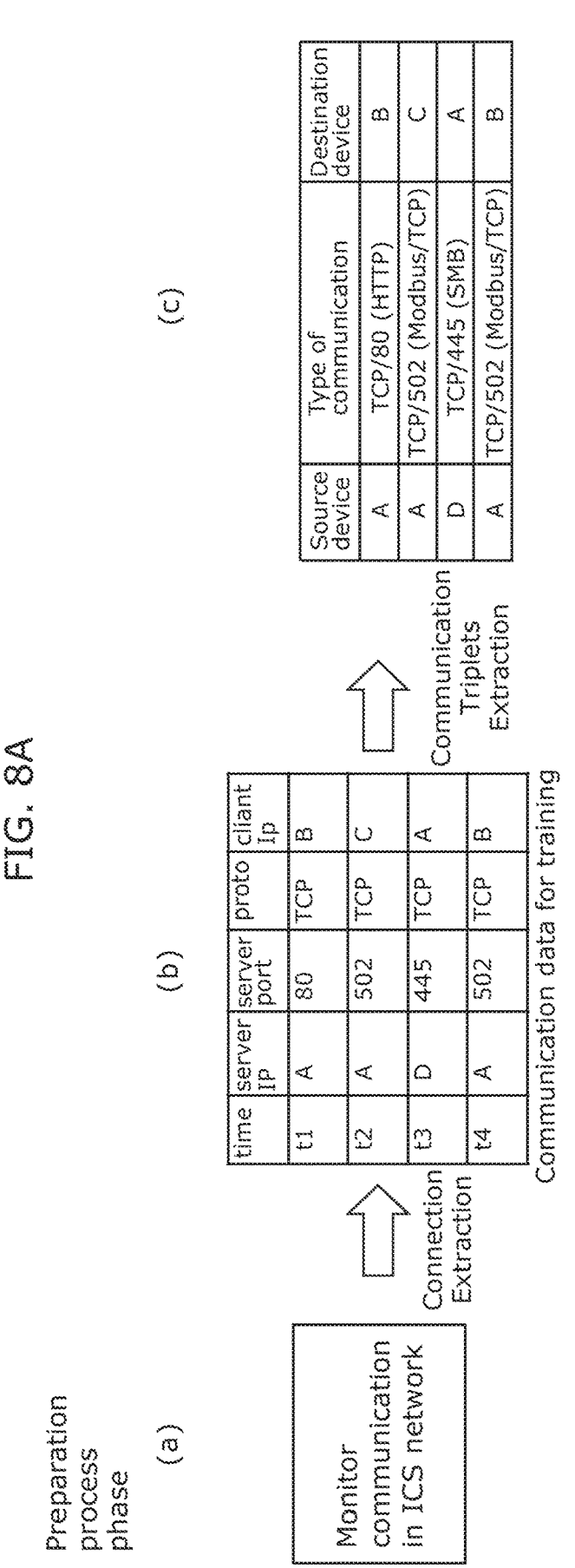
FIG. 8A is a diagram conceptually illustrating one example of the process in a preparation process phase performed by a communication monitoring system according to an embodiment.

FIG. 8A is a diagram conceptually illustrating one example of the process in the preparation process phase performed by communication monitoring system 100 according to the present embodiment.

Communication monitoring system 100, which monitors communication in the ICS network, for example, obtains connection information from a mirror packet (learning packet group) in the communication in the ICS network, as illustrated in (a) in FIG. 8A. The connection information includes information indicating a server IP (the IP address of a server), the port number of a server, a protocol, and a client IP (the IP address of a client) at each of time t1 to time t4, for example, as illustrated in (b) in FIG. 8A. Note that when some of the devices in the ICS network to be monitored are permitted to communication with the Internet via a gateway, the IP addresses of various devices on the Internet are present. In this case, communication monitoring system 100 obtains connection information excluding devices located outside the ICS network to be monitored. The port number of a client is often different depending on packets; therefore, in the present embodiment, the port number of a client is not included in the connection information.

Next, communication monitoring system 100 extracts four communication triplets from the obtained connection information. Each of the four communication triplets is a 3-tuple including a source device, the type of communication, and a destination device, as illustrated in (c) in FIG. 8A. Note that communication monitoring system 100 stores the four communication triplets illustrated in (c) in FIG. 8A into storage 31 as learning communication triplets 301.

Figure 8B:
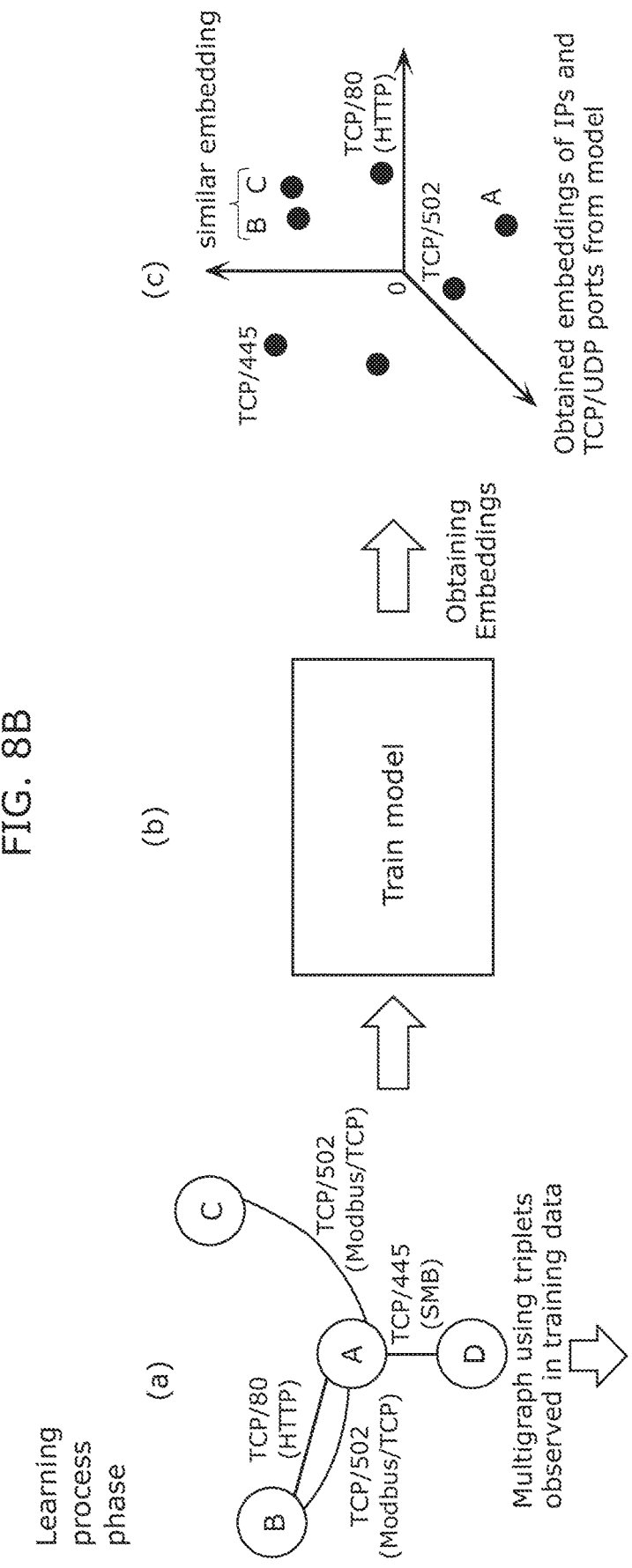
FIG. 8B is a diagram conceptually illustrating one example of the process in a learning process phase performed by a communication monitoring system according to an embodiment.

FIG. 8B is a diagram conceptually illustrating one example of the process in the learning process phase performed by communication monitoring system 100 according to the present embodiment.

Communication monitoring system 100 obtains learning communication triplet 301 from storage 31 and performs the leaning process on model 302 using learning communication triplets 301.

More specifically, first, communication monitoring system 100 obtains learning communication triplets 301 illustrated in (c) in FIG. 8A and constructs the multigraph illustrated in (a) in FIG. 8B from the obtained learning communication triplets. Next, communication monitoring system 100 trains model 302, as illustrated in (b) in FIG. 8B. In the present embodiment, communication monitoring system 100 conducts training by causing model 302 to learn the structure of the multigraph illustrated in (a) in FIG. 8B and furthermore, map each of the nodes of said multigraph to the vector representation of the fixed dimension, thereby obtaining the vector representation of learning communication triplets 301. Note that in FIG. 8B, the vector representation is referred to as embeddings.

In this manner, communication monitoring system 100 conducts training by causing model 302 to map each of the nodes of the multigraph of learning communication triplets 301 to a vector space such as that illustrated in (c) in FIG. 8B and thereby obtain the vector representation of the fixed dimension. Note that in the learning process phase, a graph autoencoder using the R-GCN may be used as model 302. The graph autoencoder using the R-GCN is a model capable of link prediction using the DistMult disclosed in NPL 4 as a scoring function.

Figure 8C:
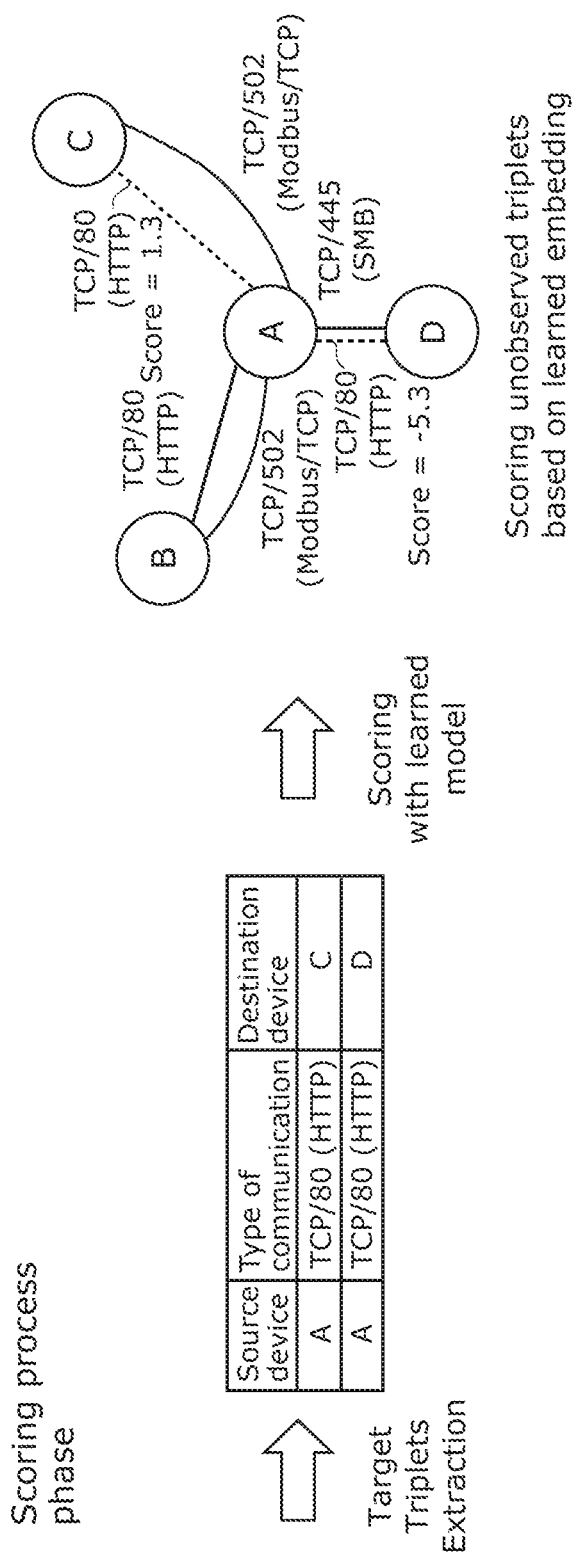
FIG. 8C is a diagram conceptually illustrating one example of the process in a scoring process phase performed by a communication monitoring system according to an embodiment.

FIG. 8C is a diagram conceptually illustrating one example of the process in the scoring process phase performed by communication monitoring system 100 according to the present embodiment.

Communication monitoring system 100, which monitors communication in the ICS network, for example, obtains connection information from a mirror packet (packet group to be analyzed) in the communication in the ICS network, as in the case of (a) in FIG. 8A. Communication monitoring system 100 extracts, from the obtained connection information, a communication triplet to be analyzed (to be monitored). Each of two communication triplets to be analyzed is a 3-tuple including A as a source device, TCP/80 as the type of communication, and C or D as a destination device, as illustrated in FIG. 8C.

Next, since the two communication triplets to be analyzed that are indicated in FIG. 8C are not among learning communication triplets 301 which are used as a whitelist, communication monitoring system 100 performs, using trained model 302, the scoring process for the communication triplets to be analyzed.

More specifically, communication monitoring system 100 causes trained model 302 to convert the communication triplet to be analyzed into a multigraph and map two nodes of the multigraph to the vector representation of the fixed dimension, thereby obtaining the vector representation of the communication triplet to be analyzed. Furthermore, using trained model 302, communication monitoring system 100 estimates, from the learned vector representation illustrated in (c) in FIG. 8B and the obtained vector representation of the communication triplet to be analyzed, the score of the communication triplet to be analyzed, and outputs the score. In the example illustrated in FIG. 8C, the score of the communication triplet to be analyzed that includes A as the source device, TCP/80 (HTTP) as the type of communication, and C as the destination device is 1.3. The score of the communication triplet to be analyzed that includes A as the source device, TCP/80 (HTTP) as the type of communication, and D as the destination device is −5.3. When any of the scores is less than or equal to a threshold value (for example, 0), the communication with these two communication triplets to be analyzed is determined as being normal (not suspicious).

2.1 R-GCN Included in Model 302

Hereinafter, the R-GCN included in model 302 will be described.

The R-GCN is a network model that is an extension of a graph convolutional network (GCN), which is a network model that convolutes a graph structure, and is disclosed in NPL 5. The use of the R-GCN allows accurate link prediction in the multigraph.

When data having a graph structure is input, the R-GCN convolutes the graph structure and outputs the feature amount of said data. The R-GCN extracts a feature amount for each of the nodes of the graph structure and convolutes one node using a current node and a neighboring node to convolute the graph structure. The graph structure is convoluted assuming that information propagates (feedforward propagation) in consideration of the type and direction of an edge in each layer of the R-GCN layer.

The feedforward propagation in one layer of a multilayer R-GCN can be represented by Expression 1 below.

[Math. 1]

$$h_i^{(l+1)} = \sigma\left(\sum_{(j \in N_i)} \frac{1}{c_i} W^{(l)} h_j^{(l)} + W_0^{(l)} h_i^{(l)}\right) \quad \text{Expression 1}$$

The left-hand side represents the vector of node i in the (l+1)-th layer. The first term on the right-hand side represents the sum of convolutions at the neighboring nodes, and the second term on the right-hand side represents the convolution at the current node. Note that $N_i$ is a set of nodes neighboring node i, $1/c_i$ is a normalization constant, and a is a non-linear activation function.

Let us now take, as an example, the graph structure of the multigraph illustrated in FIG. 6B and focus on node B.

In the GCN, there can be only one edge (also referred to as one link) in the graph structure; when there is only HTTP as the type of the edge of node B illustrated in FIG. 6B, Expression 1 can be represented as Expression 2 below.

[Math. 2]

$$h_B^{(l+1)} = \sigma\left(\overset{(1)}{\ldots} + \overset{(2)}{\ldots}\right) \quad \text{Expression 2}$$

In Expression 2, the left-hand side represents the vector of node B illustrated in FIG. 6B in the (l+1)-th layer. The first term on the right-hand side that is indicated by the dotted box (1) represents propagation from the link with node A, and the second term on the right-hand side that is indicated by the dotted box (2) represents propagation from node B itself which is called a self-loop.

The feedforward propagation in one layer of the multi-layer R-GCN can be represented by Expression 3 below.

[Math. 3]

$$h_i^{(l+1)} = \sigma\left(\sum_{j \in R} \sum_{j \in N_i^p} \frac{1}{c_{i,p}} W_p^{(l)} h_j^{(l)} + W_0^{(l)} h_i^{(l)}\right) \quad \text{Expression 3}$$

The left-hand side represents the vector of node i in the (l+1)-th layer. The first term on the right-hand side represents the sum of convolutions at the neighboring nodes related to node i, and the second term on the right-hand side represents the convolution at the current node. Note that $N_{i,p}$ is a set of nodes neighboring node i and related to node i, $1/c_{i,p}$ is a normalization constant, and a is a non-linear activation function.

Let us now take, as an example, the graph structure of the multigraph illustrated in FIG. 6B and focus on node B, as in the above case.

In the R-GCN, there can be more than one edge (also referred to as more than one link) in the graph structure; thus, Expression 3 can be represented as Expression 4 below.

[Math. 4]

$$h_B^{(l+1)} = \sigma\left(\underbrace{\ldots}_{(3)} + \underbrace{\ldots}_{(4)} + \underbrace{\ldots}_{(5)}\right) \quad \text{Expression 4}$$

In Expression 4, the left-hand side represents the vector of node B in the (l+1)-th layer. The first term on the right-hand side that is indicated by the dotted box (3) represents propagation from the HTTP link with node A, and the second term on the right-hand side that is indicated by the dotted box (4) represents propagation from the MSSQL link with node A. The third term on the right-hand side that is indicated by the dotted box (5) represents propagation from node B itself which is called a self-loop.

In the present embodiment, using model 302 including the R-GCN, communication triplets indicating communication situations in the ICS network are interpreted as a multigraph, and the possibility that a communication triplet to be monitored that is not included in the whitelist emerges as a link of the multigraph is estimated.

In other words, the present disclosure regards the problem of scoring communications that are not present in the whitelist as a link prediction problem in multigraphs where the IP addresses observed in the ICS network are interpreted as nodes and the types of communication such as TCP/UDP used between two IP addresses are interpreted as edges. Furthermore, the present disclosure interprets the link prediction problem in multigraphs as a task to predict whether a communication triplet is a communication triplet that has not been observed so far, but may be likely to exist (that is, a normal communication triplet).

Note that the inventors have the following two hypotheses for accurately estimating whether an unobserved link is normal.

(1) The presence or absence of a link between two device is determined depending on the roles of the devices. The roles of the devices are the types of the devices such as HMI, PLC, RTU, Historian, and SIS or the types of communication thereof.

(2) The roles of the devices can be recursively estimated from the roles of one or more neighboring (linked) devices. Furthermore, the use of the convolution of the graph structure allows the roles to be reflected to latent vectors, meaning that role information of the neighboring devices can be propagated.

Assuming, based on these two hypotheses, that embeddings (vector representation) indicating the roles of the devices can be recursively extracted when the R-GCN is used, the R-GCN is included in model 302 in the present embodiment.

Furthermore, by causing model 302 including the R-GCN to learn the communication triplets observed in the ICS network, it is possible to estimate, as a score, the anomaly of the communication triplets that have not been observed in the ICS network.

3. Operation of Communication Monitoring System 100

The operation of communication monitoring system 100 configured as described above will be described below.

FIG. 9 is a flowchart illustrating the outline of operation of communication monitoring system 100 according to the present embodiment.

First, communication monitoring system 100 performs a learning communication triplet extraction process (S1). Note that the learning communication triplet extraction process performed in Step S1 corresponds to the processing in the above-described preparation process phase. Next, communication monitoring system 100 performs a learning process (S2). Note that the learning process performed in Step S2 corresponds to the processing in the above-described learning process phase. Next, communication monitoring system 100 performs a scoring process (S3). The scoring process in Step S3 corresponds to the processing in the above-described scoring process phase.

Figure 10:
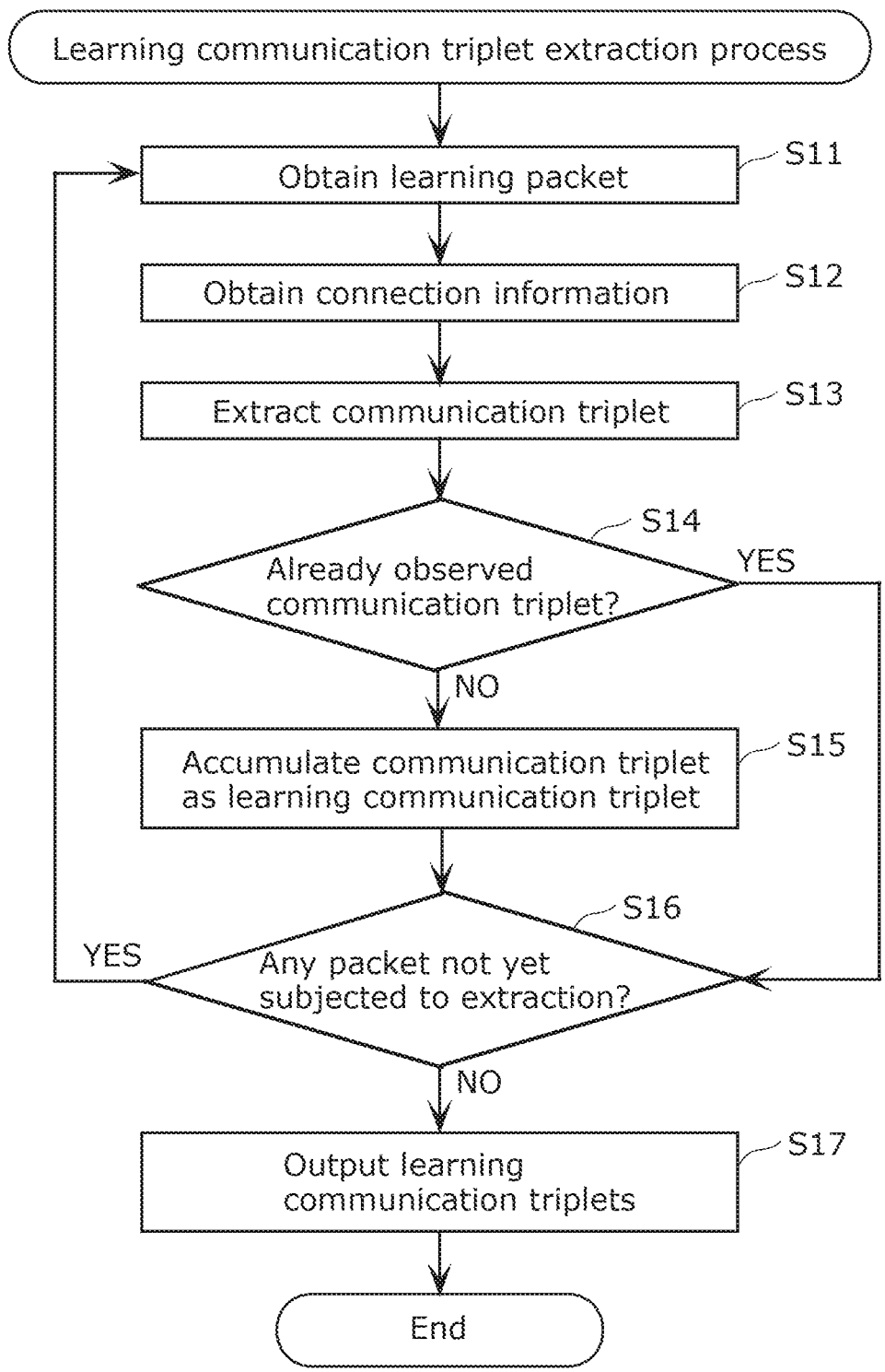
FIG. 10 is a flowchart illustrating details of the learning communication triplet extraction process illustrated in FIG. 9.

FIG. 10 is a flowchart illustrating details of the learning communication triplet extraction process illustrated in FIG. 9.

First, communication monitoring system 100 obtains a leaning packet (S11). In the present embodiment, communication monitoring system 100 obtains, as the learning packet, a mirror packet in communication in a network such as the ICS network, for example.

Next, communication monitoring system 100 obtains connection information from the learning packet that has been obtained in Step S11 (S12). In the present embodiment, communication monitoring system 100 obtains, from the learning packet that has been obtained in Step S11, connection information including information indicating the IP address of a server, the port number of the server, a protocol, and the IP address of a client.

Next, communication monitoring system 100 extracts a communication triplet from the connection information obtained in Step S12 (S13). In the present embodiment, communication monitoring system 100 extracts, from the connection information obtained in Step S12, a communication triplet that is a 3-tuple including a source device, the type of communication, and a destination device. For example, the source device is the IP address of a server, the type of communication is the port number of the server and a protocol, and the destination device is the IP address of a client.

Next, communication monitoring system 100 determines whether the communication triplet extracted in Step S13 has already been observed (S14). In the present embodiment, communication monitoring system 100 determines whether the communication triplet extracted in Step S13 has been stored as learning communication triplet 301.

When the extracted communication triplet is determined in Step S14 as not being an already observed communication triplet (NO in S14), communication monitoring system 100 accumulates the extracted communication triplet as learning communication triplet 301 (S15).

Next, communication monitoring system 100 checks whether there is any packet from which a communication triplet has not yet been extracted aside from the learning packet that has been obtained in Step S11 (S16).

Note that when the extracted communication triplet is determined in Step S14 as being an already observed communication triplet (YES in S14), communication monitoring system 100 proceeds to the processing in Step S16.

When it is determined in Step S16 that there is no packet from which a communication triplet has not been extracted (NO in S16), communication monitoring system 100 outputs the accumulated learning communication triplets (S17). On the other hand, when it is determined in Step 16 that there is a packet from which a communication triplet has not been extracted (YES in S16), communication monitoring system 100 returns to Step S11 and repeats these processes.

FIG. 11 is a flowchart illustrating details of the learning process illustrated in FIG. 9.

First, communication monitoring system 100 obtains a learning communication triplet (S21). In the present embodiment, communication monitoring system 100 obtains learning communication triplet 301 from storage 31.

Next, communication monitoring system 100 constructs a multigraph of learning communication triplets 301 that has been obtained in Step S21 (S22).

Next, communication monitoring system 100 causes model 302 to learn the multigraph constructed in Step S22 (S23). In the present embodiment, model 302 includes the R-GCN, for example. Communication monitoring system 100 causes model 302 to learn the structure of the multigraph constructed in Step S22 and map each of the nodes of the constructed multigraph to the vector representation of the fixed dimension, thereby obtaining the vector representation of learning communication triplets 301. For example, model 302 is trained using a graph autoencoder; through learning with the graph autoencoder, the vector representation of nodes and edges can be obtained.

Next, in Step S24, communication monitoring system 100 outputs the vector representation of learning communication triplet 301 that has been obtained by learning, in other words, the embeddings of the nodes and the embeddings of the edges (S24). Note that, in Step S24, trained model 302 includes information of the vector representation of learning communication triplet 301 that has been obtained by learning, in other words, the embeddings of the nodes and the embeddings of the edges.

FIG. 12 is a diagram illustrating algorithm 1 for performing the learning process illustrated in FIG. 11.

In FIG. 12, V indicates a set of observed IP addresses, and R indicates a set of observed TCP/UDP port numbers.

$$\hat{\varepsilon}$$ [Math. 5]

This indicates learning communication triplet 301.

$$e_i \in \mathbb{R}^d$$ [Math. 6]

This indicates the embeddings of IP addresses and can be obtained by calculating the feedforward propagation using Expression 3 indicated above.

$$Rp_i \in \mathbb{R}^{d \times d}$$ [Math. 7]

This indicates the parameter of model 302.

$$W_{Pj}^{(l)}$$ [Math. 8]

As mentioned above, this indicates the weight of the R-GCN, and l indicates the number of hidden layers.

Note that the parameter of model 302 is optimized as a loss function using a cross-entropy error such as that indicated in Expression 5 blow.

[Math. 9]

$$L = -\frac{1}{(1+\omega)|\hat{\varepsilon}|} \sum_{(s,p,c,y)\in T} y \log l(f(s, p, c)) + (1-y)\log(1 - l(f(s, p, c)))$$ Expression 5

In Expression 5, T indicates the total of real and corrupted communication triplets, f(s, p, c) is the score of communication triplet (s, p, c), l indicates the logistic sigmoid function, and y indicates an indicator.

Figure 13:
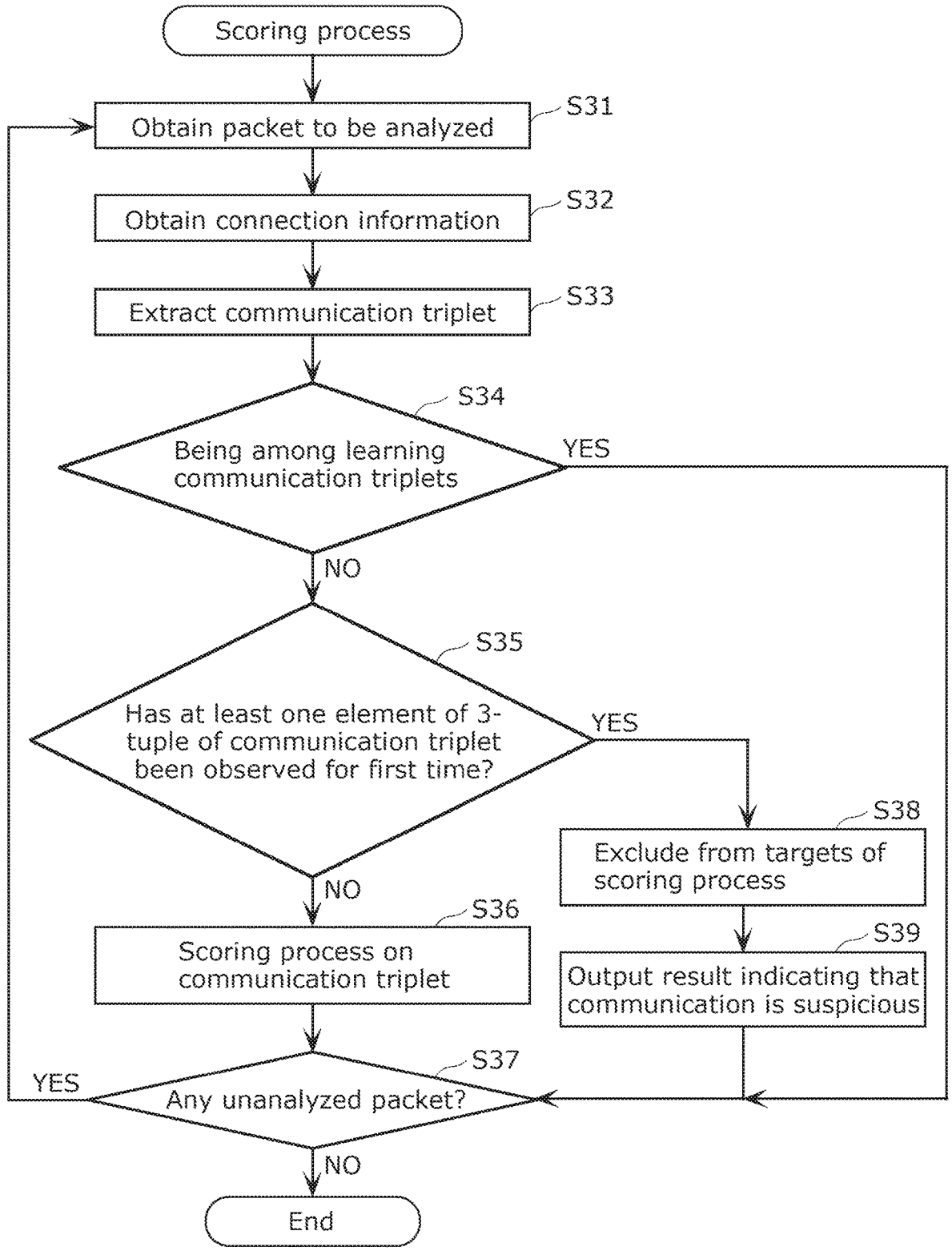
FIG. 13 is a flowchart illustrating details of the scoring process illustrated in FIG. 9.

FIG. 13 is a flowchart illustrating details of the scoring process illustrated in FIG. 9. Note that the processing illustrated in FIG. 13 may be performed by communication monitoring device 1 described above.

First, communication monitoring system 100 obtains a packet to be analyzed (S31). In the present embodiment, communication monitoring system 100 obtains, as the packet to be analyzed, a mirror packet in communication in a network such as the ICS network, for example.

Next, communication monitoring system 100 obtains connection information from the packet to be analyzed that has been obtained in Step S31 (S32). In the present embodiment, communication monitoring system 100 obtains, from the packet to be analyzed that has been obtained in Step S31, connection information including information indicating the IP address of a server, the port number of the server, a protocol, and the IP address of a client.

Next, communication monitoring system 100 extracts a communication triplet from the connection information obtained in Step S32 (S33). In the present embodiment, communication monitoring system 100 extracts, from the connection information obtained in Step S32, a communication triplet that is a 3-tuple including a source device, the type of communication, and a destination device. For example, the source device is the IP address of a server, the type of communication is the port number of the server and a protocol, and the destination device is the IP address of a client.

Next, communication monitoring system 100 determines whether the communication triplet extracted in Step S33 is among learning communication triplets 301 (S34). In the present embodiment, communication monitoring system 100 uses, as a whitelist, learning communication triplets 301. This means that communication monitoring system 100 determines whether the communication triplet extracted in Step S33 is present in the whitelist.

When it is determined in Step S34 that the extracted communication triplet is not among learning communication triplets 301 (NO in S34), communication monitoring system 100 determines whether at least one element of the 3-tuple of the extracted communication triplet has been observed for the first time (S35). The 3-tuple includes the IP address of a server, the IP address of a client, and a TCP/UDP port number, for example. The case where at least one element of the 3-tuple of the extracted communication triplet has been observed for the first time is the case where at least one element of said 3-tuple is not present in the whitelist.

When it is not determined in Step S35 that at least one element of the 3-tuple of the extracted communication triplet has been observed for the first time (NO in S35), communication monitoring system 100 performs the scoring process on the extracted communication triplet (S36). In the present embodiment, model 302 includes the R-GCN, for example. Therefore, communication monitoring system 100 causes trained model 302 to convert the communication triplet to be analyzed into a multigraph and map two nodes of the multigraph to the vector representation of the fixed dimension, thereby obtaining the vector representation of the communication triplet to be analyzed. Furthermore, using trained model 302, communication monitoring system 100 estimates, from the learned vector representation and the obtained vector representation of the communication triplet to be analyzed, the score of the communication triplet to be analyzed and outputs the score.

Next, communication monitoring system 100 checks whether there is any packet that has not yet been analyzed aside from the packet to be analyzed that has been obtained in Step S31 (S37).

When there is no packet that has not yet been analyzed in Step S37 (NO in S37), communication monitoring system 100 ends the scoring process. On the other hand, when there is a packet that has not yet been analyzed in Step S37 (YES in S37), communication monitoring system 100 returns to Step S31 and repeats these processes.

Note that in Step S34, when the extracted communication triplet is among learning communication triplets 301 (YES in S34), communication monitoring system 100 determines that the communication of the extracted communication triplet is not suspicious, and proceeds to Step S37.

Furthermore, when it is not determined in Step S35 that at least one element of the 3-tuple of the extracted communication triplet has been observed for the first time (YES in S35), communication monitoring system 100 excludes the extracted communication triplet from the subjects of the scoring process (S38). Subsequently, communication monitoring system 100 outputs a result indicating the communication of the extracted communication triplet is suspicious (S39).

FIG. 14 is a diagram illustrating algorithm 2 for performing the scoring process illustrated in FIG. 13. Note that variables substantially the same as those in FIG. 12 are indicated as the same variables, and thus description thereof will be omitted.

$$(\tilde{s}, \tilde{p}, \tilde{c}) \quad \text{[Math. 10]}$$

In FIG. 14, this indicates the communication triplet to be analyzed.

$$(e_{\tilde{s}}, R_{\tilde{p}}, e_{\tilde{c}}) \quad \text{[Math. 11]}$$

This indicates the embeddings of said communication triplet.

$$e_{\tilde{s}}^T R_{\tilde{p}} e_{\tilde{c}} \quad \text{[Math. 12]}$$

This indicates the score of said communication triplet.

4. Advantageous Effects, Etc.

According to the present embodiment, using model 302 including the R-GCN, communication triplets indicating communication situations in the ICS network are interpreted as a multigraph, and the possibility that a communication triplet to be monitored that is not included in the whitelist emerges as a link of the multigraph is estimated as a score. Note that when the possibility of the emergence of a communication triplet that is not included in the whitelist is handled as the link prediction problem in multigraphs, it is possible to accurately estimate the score of the communication triplet that is not included in the whitelist.

With this, when the possibility of the emergence of a communication triplet that is not included in the whitelist is quantified as a score, it is possible to narrow down to important communication triplets to be analyzed from the perspective of security, meaning that false detections of network communication can be reduced.

Furthermore, among alerts that are raised when a communication triplet not included in the whitelist is observed, an unimportant alert can be excluded using the score of the communication triplet not included in the whitelist, allowing a security operator to focus only on fatal alerts.

Note that model 302 is described as including the R-GCN in the above embodiment, but this is not limiting. Model 302 may be COMPosition-based multi-relational Graph Convolutional Networks (COMPGCN) disclosed in NPL 6. In this case, it is sufficient that trained model 302 convert a set of 3-tuples of the first communication triplet into a multigraph in which the information indicating the source device and the information indicating the destination device are nodes and the information indicating the type of communication is the type of an edge, and obtain the vector representation of the first communication triplet from said multigraph. Subsequently, it is sufficient that a score be estimated from the obtained vector representation of the first communication triplet using the link prediction algorithm.

Furthermore, model 302 may be a DistMult or convolutional 2D knowledge graph embeddings (convE) disclosed in NPL 7. Alternatively, model 302 may be translating embeddings for modeling multi-relational data (TransE) disclosed in NPL 8. Alternatively, model 302 may be holographic embeddings of knowledge graphs (HolE) disclosed in NPL 9. Alternatively, model 302 may be complex embeddings for simple link prediction (ComplEx) disclosed in NPL 10.

In these cases, it is sufficient that trained model 302 obtain the vector representation of the first communication triplet from the set of 3-tuples of the first communication triplet and estimate a score from the obtained vector representation of the first communication triplet using the link prediction algorithm.

Working Example

The effectiveness of model 302 including the R-GCN was verified; the result of experiments thereof will be described below as a working example.

<Dataset>

FIG. 15 is a diagram illustrating the nature of a dataset according to the present working example.

In the present example, the traffic of the ICS network in three factories owned by Panasonic Corporation was used for evaluation. Note that each factory produces different items, and installed facilities, communication protocols, and network configurations are different depending on the factories.

Packets in the ICS network used in the three factories were independently collected for two weeks each, using the mirror port of a L2 switch. In these three factories, in addition to protocols such as Modbus and Ethernet/IP, protocols such as NetBIOS, DNS, HTTP, HTTPS, FTP, SMB, RDP, SSH, and MSSQL were observed. Therefore, only unicast communications excluding multicast and broadcast communications were subjected to the learning process and the scoring process.

The numbers of IP addresses, the TCP/UDP port numbers, and learning communication triplets that are illustrated in FIG. 15 were obtained by counting the number of emergence thereof in communication in the ICS network at the three factories, namely, A, B, and C, in a specific one week. Test communication triplets were obtained one week after the specific one week. Note that communication triplets included in the learning communication triplets were excluded from the test communication triplets. Furthermore, communication triplets having unobserved IP addresses or TCP/UDP port numbers were also excluded from the test communication triplets.

<Evaluation Method>

As comparative examples for model 302 including the R-GCN, a model including the DistMult, and a first-order proximity priority method and a second-order proximity priority method, which are heuristic, were also evaluated. Note that the DistMult has substantially the same configuration as a R-GCN having no graph structure convolutional layers. In the following description, model 302 including the R-GCN will be referred to as GCN SCOPE (proposed).

The GCN SCOPE and the comparative examples were evaluated through two different methods that are link prediction evaluation in which the presence of test communication triplets is predicted and an evaluation on how well normal communication triplets and anomalous communication triplets can be distinguished (recognized).

Hyper parameters of the GCN SCOPE and the model including the DistMult were searched for. The search for hyper parameters was conducted by splitting the dataset of factory A into data for learning and data for validation and using bays optimization with the mean reciprocal rank in the validation data. As a result, the hyper parameters of the GCN SCOPE were determined as follows. Specifically, the dropout rate was determined to be 0.2, the number of hidden layer units was determined to be 100, the L2 regularization weight was determined to be 0.0, the learning rate was determined to be 0.01, and the negative sampling rate was determined to be 10. The hyper parameters of the model including the DistMult were determined as follows. Specifically, the number of hidden layer units was determined to be 50, the L2 regularization weight was determined to be 0.01, the learning rate was determined to be 0.02, and the negative sampling rate was determined to be 10.

<Evaluation Results>

FIG. 16 is a diagram illustrating the evaluation result of link prediction in which test communication triplets according to the present working example are used for prediction.

The GCN SCOPE, the model including the DistMult, and the like were trained using learning communication triplets in the respective datasets of the three factories indicated in FIG. 15, and output the scores of the test communication triplets. Subsequently, the output scores were evaluated using the mean reciprocal rank (MRR) such as that indicated in Expression 6 below and the proportion of entities that were ranked within the top n. The result is shown in FIG. 16. Note that $rank_i$ in Expression 6 represents the rank position of the correct answer for the i-th query.

[Math. 13]

$$MRR = \frac{1}{|Q|} \sum_{i=1}^{|Q|} \frac{1}{rank_i} \qquad \text{Expression 6}$$

As shown in FIG. 16, the GCN SCOPE exceeds the comparative examples including the model including the DistMult in almost all cases. This shows that the GCN SCOPE can exhibit high performance in the link prediction for communication triplets in the ICS network.

FIG. 17 is a diagram illustrating evaluation of the ability of distinguishing between anomalous links and normal links based on the scores that have been output using the test communication triplets according to the present working example. In FIG. 17, ROC-AUC is used to quantify the evaluation of the distinguishing ability. Here, ROC is an abbreviation for receiver operating characteristic, AUC is an abbreviation for under the curve, and ROC-AUC represents the area under the ROC curve. ACU can take values between 0 and 1; the closer to 1 the value of ACU is, the higher the distinguishing ability is.

Here, the test communication triplets were used as negative samples, and random communication triplets were used as positive samples. The random communication triplets were generated by selecting two different IP addresses and TCP/UDP port numbers separately and uniformly at random from the elements included in the learning communication triplets.

Subsequently, the distinguishing ability was evaluated on the basis of the scores output by the GCN SCOPE, the model including the DistMult, and the like from the test communication triplets. The ability of distinguishing between anomalous links and normal links was evaluated through threshold determination of the output score.

As can be seen from FIG. 17, the average ROC-AUC of the GCN SCOPE is 0.957, which means that the distinguishing ability is superior to those in the first-order proximity priority method and the second-order proximity priority method. This shows that the GCN SCOPE is capable of accurately distinguishing between normal communication triplets and anomalous communication triplets.

The foregoing indicates that the GCN SCOPE can accurately handle, as link prediction in multigraphs, the possibility of the emergence of a communication triplet that is not included in the whitelist, and accurately estimate the score of a communication triplet that is not included in the whitelist.

This allows the GCN SCOPE to quantify, as a score, the possibility of the emergence of a communication triplet that is not included in the whitelist, and thus narrow down to important communication triplets to be analyzed from the perspective of security, meaning that false detections of network communication can be reduced.

Variation

The above embodiment describes the case where the communication triplets (the second communication triplets) obtained from network communication performed in the predetermined period are determined as being safe and then stored into storage 30 as a whitelist. Furthermore, the above embodiment describes the case where the second communication triplets stored in storage 30 are used as learning communication triplets 301.

However, there is a possibility that the second communication triplets obtained from the network communication performed in the predetermined period may include an unsafe second communication triplet. In other words, there is a possibility that one or more links of a multigraph constructed using, as learning communication triplets 301, the second communication triplets obtained from network communication performed in the predetermined period, as illustrated in (a) in FIG. 8B, for example, may be anomalous. For example, when one or more links of the multigraph constructed at the time of learning are, for example, setting errors or are generated by malware, the one or more links are not safe, but are anomalous.

If model 302 is trained using the multigraph having such an anomalous link, an anomalous communication triplet may be overlooked at the time of the scoring process.

In view of this, the present variation describes a method, etc., for checking whether learning communication triplets 301 include an anomalous communication triplet.

5.1 Configuration of Learning Device Unit 2A

Figure 18:
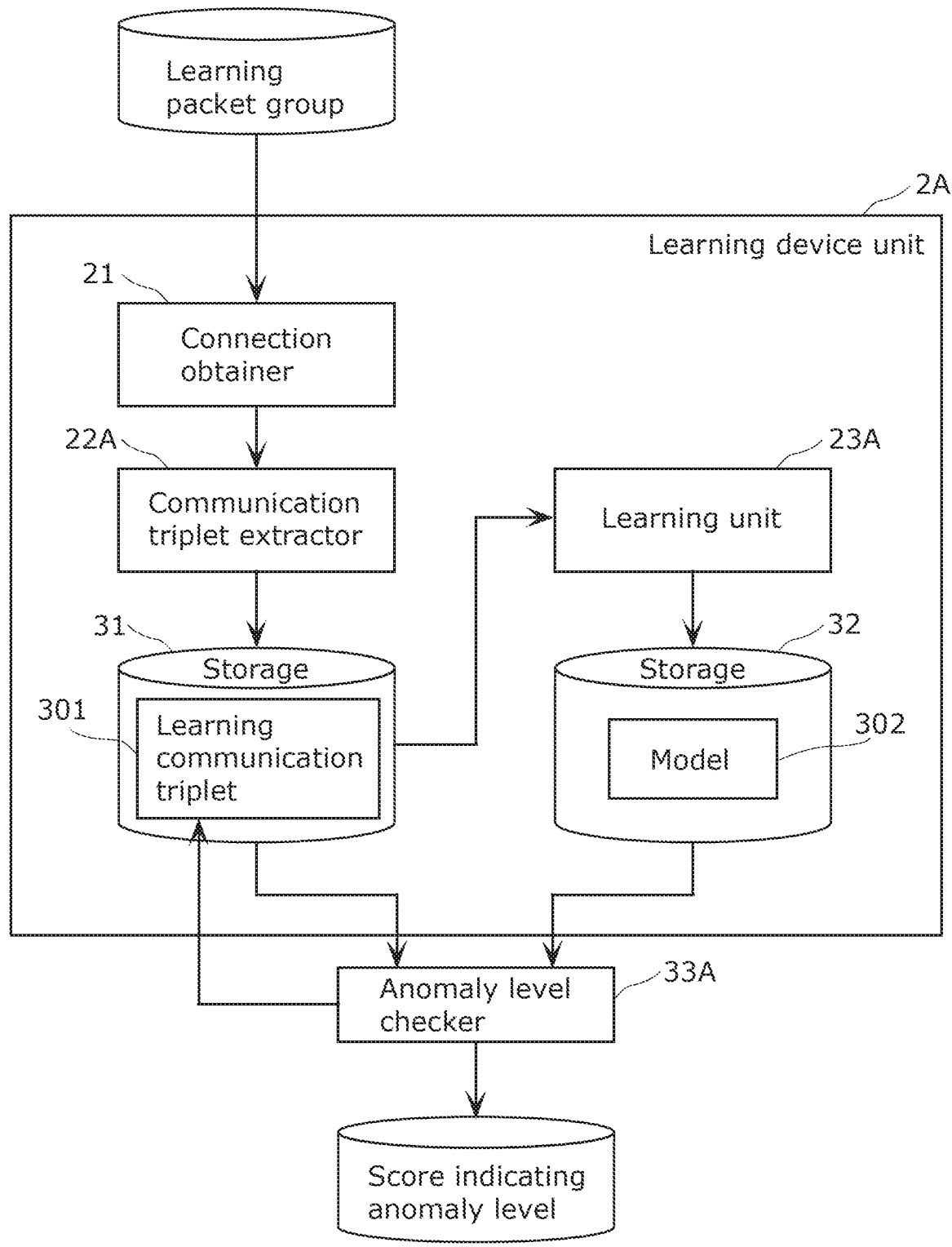
FIG. 18 is a block diagram illustrating one example of the configuration of a learning device unit according to a variation.

FIG. 18 is a block diagram illustrating one example of the configuration of learning device unit 2A according to the present variation. Elements that are substantially the same as those in FIG. 1 are assigned the same reference signs and detailed description thereof will be omitted.

Learning device unit 2A includes connection obtainer 21, communication triplet extractor 22A, learning unit 23A, storage 31, storage 32, and anomaly level checker 33A, as illustrated in FIG. 18. Learning device unit 2A illustrated in FIG. 18 is different from learning device unit 2 illustrated in FIG. 1 in that anomaly level checker 33A is additionally included and communication triplet extractor 22A and learning unit 23A having different configurations are included.

[5.1.1 Communication Triplet Extractor 22A]

Communication triplet extractor 22A obtains third communication triplets from network communication performed in a predetermined period. Each of the plurality of third communication triplets herein is a 3-tuple including information indicating a source device, information indicating a destination device, and information indicating the type of communication. In the example illustrated in FIG. 18, communication triplet extractor 22A extracts a communication triplet as a third communication triplet from the connection information obtained by connection obtainer 21 and stores the communication triplet into storage 31 as learning communication triplet 301.

Note that as with communication triplet extractor 22, when the extracted communication triplet is found stored (already observed) as learning communication triplet 301, communication triplet extractor 22A does not add the communication triplet to learning communication triplet 301.

Although described later, in learning device unit 2A, there are cases where anomaly level checker 33A only presents or outputs, to a display screen, a score indicating the anomaly level estimated using trained model 302 and does not update learning communication triplet 301 that is stored in storage 31. In this case, it is sufficient that communication triplet extractor 22A operate in substantially the same manner as communication triplet extractor 22. Specifically, it is sufficient that communication triplet extractor 22A extract a communication triplet from network communication performed in a predetermined period and obtain the communication triplet as the second communication triplet.

[5.1.2 Learning Unit 23A]

Using learning communication triplet 301 that is stored in storage 31, learning unit 23A performs the learning process on model 302 stored in storage 32. Subsequently, learning unit 23A updates model 302 stored in storage 32 to trained model 302.

In the present variation, using the third communication triplet as data for learning, learning unit 23A performs the learning process of causing model 302 to obtain the vector representation of the third communication triplet and estimate, as a score, the possibility that network communication performed in a predetermined period emerges.

Furthermore, learning unit 23A may use, as data for re-learning, communication triplets obtained by excluding one or more third communication triplets from the plurality of third communication triplets on the basis of scores indicating the anomaly levels estimated by anomaly level checker 33A. In this case, it is sufficient that using said data for re-learning, learning unit 23A perform the re-learning process of causing model 302 to obtain the vector representation of the third communication triplet included in the data for re-learning and estimate, as a score, the possibility that network communication performed in a predetermined period emerges.

More specifically, it is sufficient that in the learning process or the re-learning process, learning unit 23A construct, from the set of 3-tuples of the third communication triplet, a multigraph in which the information indicating the source device and the information indicating the destination device are nodes and the information indicating the type of communication is the type of an edge. Subsequently, it is sufficient that learning unit 23A input the constructed multigraph to model 302 and thus conduct training by causing model 302 to map each of the nodes of said multigraph to the vector representation of the fixed dimension and obtain the vector representation of the third communication triplet.

Note that although described later, in learning device unit 2A, there are cases where anomaly level checker 33A only presents or outputs, to a display screen, a score indicating the anomaly level estimated using trained model 302 and does not update learning communication triplet 301 that is stored in storage 31. In this case, it is sufficient that learning unit 23A operate in substantially the same manner as learning unit 23. Specifically, it is sufficient that using the second communication triplet as data for learning, learning unit 23A perform the learning process of causing model 302 to obtain the vector representation of the second communication triplet and estimate, as a score, the possibility that network communication performed in a predetermined period emerges.

Furthermore, the second communication triplet used as the data for learning or the third communication triplet used as the data for learning or the data for re-learning may include a feature amount regarding network communication performed in the predetermined period as the type of communication, in addition to said type of communication. This feature amount may include at least one of the amount of communication per unit time and the median communication time interval in the network communication performed in the predetermined period. With this, learning unit 23A enables the vector representation that is obtained by model 302 to have increased accuracy and enables the score that is estimated by trained model 302 to have increased accuracy.

[5.1.3 Anomaly Level Checker 33A]

Using trained model 302, anomaly level checker 33A estimates a score indicating an anomaly level that indicates the possibility that each of the plurality of third communication triplets emerges as network communication performed in the predetermined period, and outputs the score.

In the present variation, in order to check whether learning communication triplets 301 include an anomalous communication triplet, anomaly level checker 33A performs a scoring process such as that described above on learning communication triplets 301 using trained model 302 that is stored in storage 32.

In other words, in the present variation, model 302 is trained using the links observed in the learning period (the links of the multigraph constructed at the time of learning), which is as described in the above embodiment. Note that in the above embodiment, every link of the multigraph constructed at the time of learning is assumed to be safe. In the present variation, assuming that not every link of the multigraph constructed at the time of learning is necessarily safe, a score indicating the anomaly level of an already observed link, that is, a link of the multigraph constructed at the time of learning is estimated.

Figure 19:
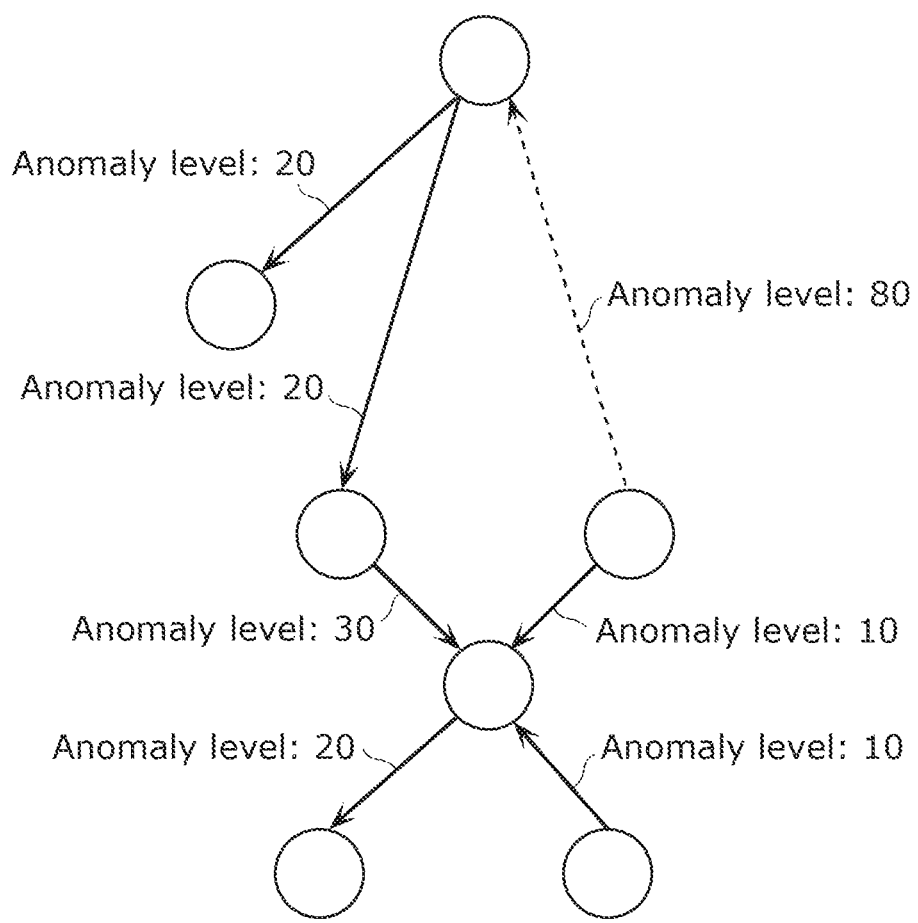
FIG. 19 is a diagram illustrating links and estimated scores indicating anomaly levels when a multigraph is constructed at the time of learning according to a variation.

FIG. 19 is a diagram illustrating links and estimated scores indicating anomaly levels when a multigraph is constructed at the time of learning according to the present variation.

In the present variation, anomaly level checker 33A causes trained model 302 to convert learning communication triplet 301 into a multigraph and map two nodes of said multigraph to the vector representation of the fixed dimension, thereby obtaining the vector representation of learning communication triplet 301. Furthermore, using trained model 302, anomaly level checker 33A estimates the score of learning communication triplet 301 as a score indicating an anomaly level from the learned vector representation such as that illustrated in (c) in FIG. 8B and the obtained vector representation of learning communication triplet 301.

FIG. 19 illustrates one example of a score indicating an anomaly level of each of the links of the multigraph constructed at the time of learning. In the example illustrated in FIG. 19, the link with (a score indicating) an anomaly level of 80 may be anomalous. Note that when a threshold value is appropriately set, whether learning communication triplets 301 include an unsafe communication triplet can be determined. Furthermore, this threshold value is preferably set less than the threshold value set in the scoring process according to the above embodiment, but may be equal to said threshold value.

Anomaly level checker 33A may output a score indicating the anomaly level of a link of the multigraph constructed at the time of learning and present the score on a display screen such as a display. In this case, a user of leaning device unit 2A can check whether each of the links of the multigraph constructed at the time of learning is normal or anomalous. Thus, a user of learning device unit 2A can store communication triplets obtained by excluding one or more third communication triplets from the plurality of third communication triplets on the basis of scores indicating anomaly levels into storage 30 as whitelist 301a (the plurality of second communication triplets).

In this manner, a user of learning device unit 2A can store communication triplets obtained by excluding unsafe third communication triplets from the plurality of third communication triplets obtained from network communication performed in a predetermined period that is a learning period using scores indicating anomaly levels into storage 30 as whitelist 301a.

Note that in the case where a user of learning device unit 2A reviews whitelist 301a, anomaly level checker 33A only need to present or display, on a display screen, the score indicating the anomaly level estimated using trained model 302. In other words, anomaly level checker 33A may avoid updating learning communication triplet 301 that is stored in storage 31. In this case, it is sufficient that using trained model 302, anomaly level checker 33A estimate a score indicating an anomaly level that indicates the possibility that each of the second communication triplets obtained from network communication performed in a predetermined period that is a learning period emerges as network communication performed in the predetermined period, and output the score.

Note that whitelist 301a may be reviewed (updated) not only by a user of learning device unit 2A, but also by anomaly level checker 33A. Specifically, anomaly level checker 33A may store communication triplets obtained by excluding one or more third communication triplets from the plurality of obtained third communication triplets on the basis of scores indicating anomaly levels into storage 30 as whitelist 301a (the plurality of second communication triplets).

Furthermore, anomaly level checker 33A may update learning communication triplet 301. Specifically, anomaly level checker 33A may update learning communication triplets 301 to the communication triplets obtained by excluding one or more third communication triplets from the plurality of third communication triplets obtained from network communication performed in a predetermined period that is a learning period on the basis of scores indicating anomaly levels. Furthermore, learning unit 23A may perform a re-learning process on model 302 using updated learning communication triplets 301. This allows communication monitoring device 1 to use re-trained model 302, making it possible to minimize the risk of overlooking an anomalous communication triplet at the time of the scoring process.

5.2 Operation of Communication Monitoring System 100 According to Present Variation The operation of communication monitoring system 100 including learning device unit 2A that is configured as described above will be described below.

Figure 20:
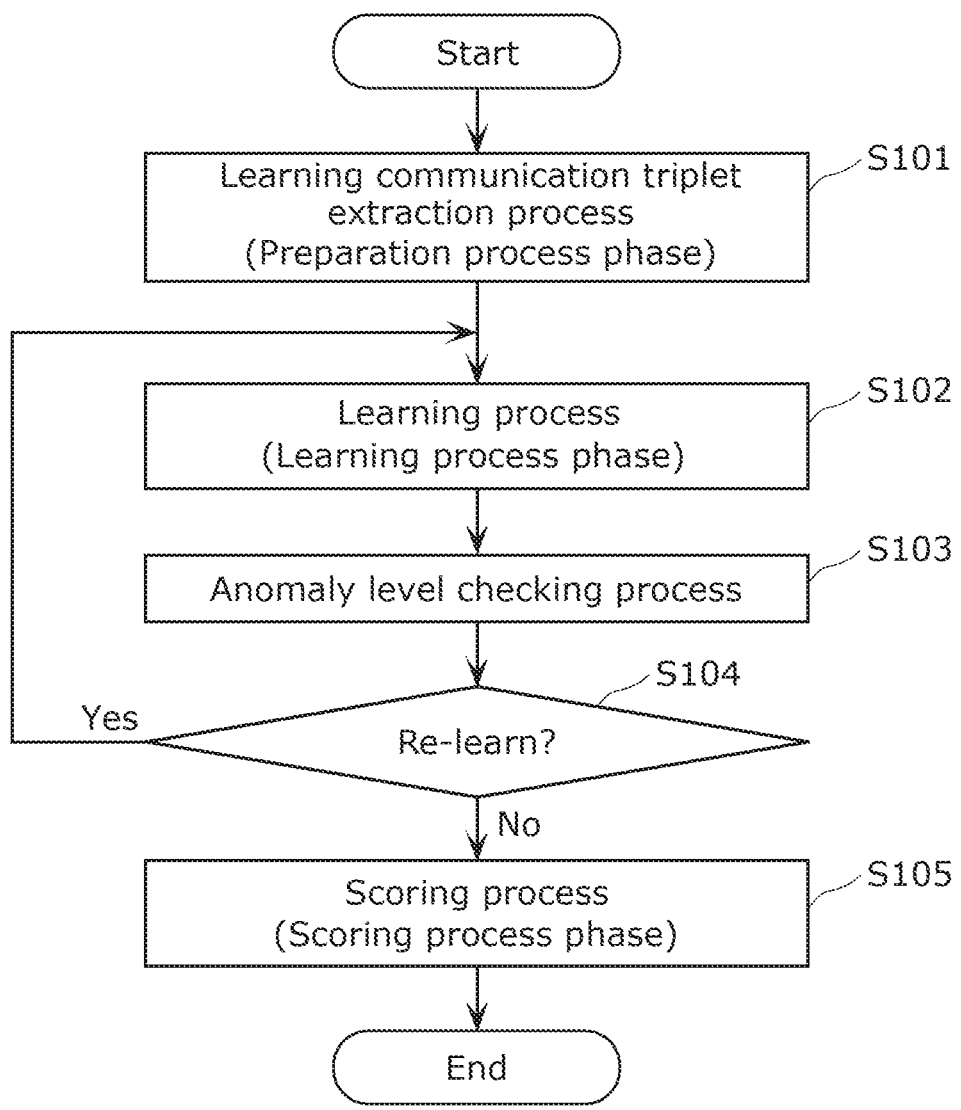
FIG. 20 is a flowchart illustrating the outline of operation of a communication monitoring system including a learning device unit according to a variation.

FIG. 20 is a flowchart illustrating the outline of operation of communication monitoring system 100 including learning device unit 2A according to the present variation.

First, communication monitoring system 100 including learning device unit 2A according to the present variation performs a learning communication triplet extraction process (S101). In the present variation, communication monitoring system 100 extracts a communication triplet from network communication performed in a predetermined period that is a learning period, and stores the communication triplet into storage 31 as learning communication triplet 301.

Next, communication monitoring system 100 performs a learning process (S102). In the present variation, communication monitoring system 100 performs the learning process on model 302 using, as data for learning, learning communication triplet 301 that has been extracted and stored in storage 31.

Next, communication monitoring system 100 performs an anomaly level checking process (S103). Details of the anomaly level checking process in Step S103 will be described later.

Next, communication monitoring system 100 determines whether to perform the re-learning process (S104).

When it is determined in Step S104 that learning communication triplet 301 has been updated, communication monitoring system 100 determines that the re-learning process is to be performed (Yes in S104), and returns to Step S102. Subsequently, in Step S102, communication monitoring system 100 performs the learning process (re-learning process) on model 302 using, as data for re-learning, updated learning communication triplet 301.

On the other hand, when it is determined in Step S104 that learning communication triplet 301 has not been updated, communication monitoring system 100 determines that the re-learning process is not to be performed (No in S104), and proceeds to Step S105.

Next, communication monitoring system 100 performs a scoring process (S105). The scoring process performed in Step S105 is substantially the same as the scoring process performed in Step S3 in FIG. 9 described above and thus, description thereof will not be repeated.

Figure 21:
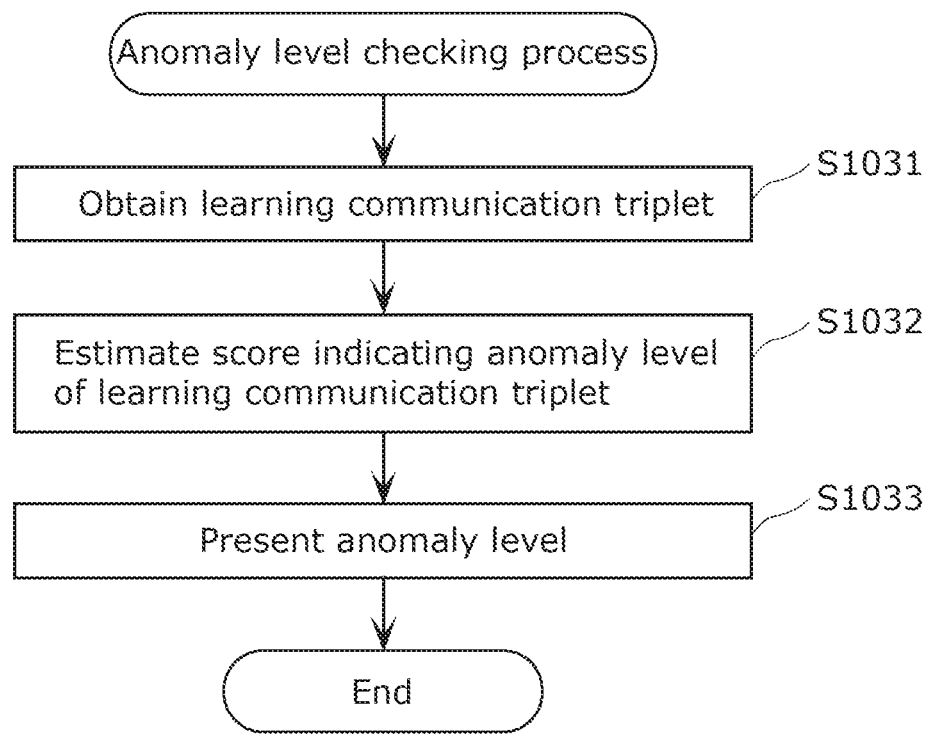
FIG. 21 is a flowchart illustrating a detailed example of an anomaly level checking process illustrated in FIG. 20.

FIG. 21 is a flowchart illustrating a detailed example of the anomaly level checking process illustrated in FIG. 20. The anomaly level checking process shown in FIG. 21 includes only presenting or outputting the estimated score indicating the anomaly level of learning communication triplet 301.

First, learning device unit 2A included in communication monitoring system 100 obtains learning communication triplet 301 that is stored in storage 31 (S1031). In the present variation, learning device unit 2A obtains, from network communication performed in a predetermined period that is a learning period, learning communication triplet 301 that includes the plurality of second communication triplets which are extracted communication triplets.

Next, learning device unit 2A estimates a score indicating an anomaly level of learning communication triplet 301 that has been obtained in Step S1031 (S1032). In the present variation, using trained model 302, learning device unit 2A estimates, as a score indicating an anomaly level, the possibility that each of the plurality of second communication triplets emerges as network communication performed in said predetermined period.

Next, learning device unit 2A presents the anomaly level (the score indicating the anomaly level) estimated in Step S1032 (S1033). In the present variation, learning device unit 2A displays, for example, on a display or the like, the anomaly level (the score indicating the anomaly level) estimated in Step S1032, to present the anomaly level.

Figure 22:
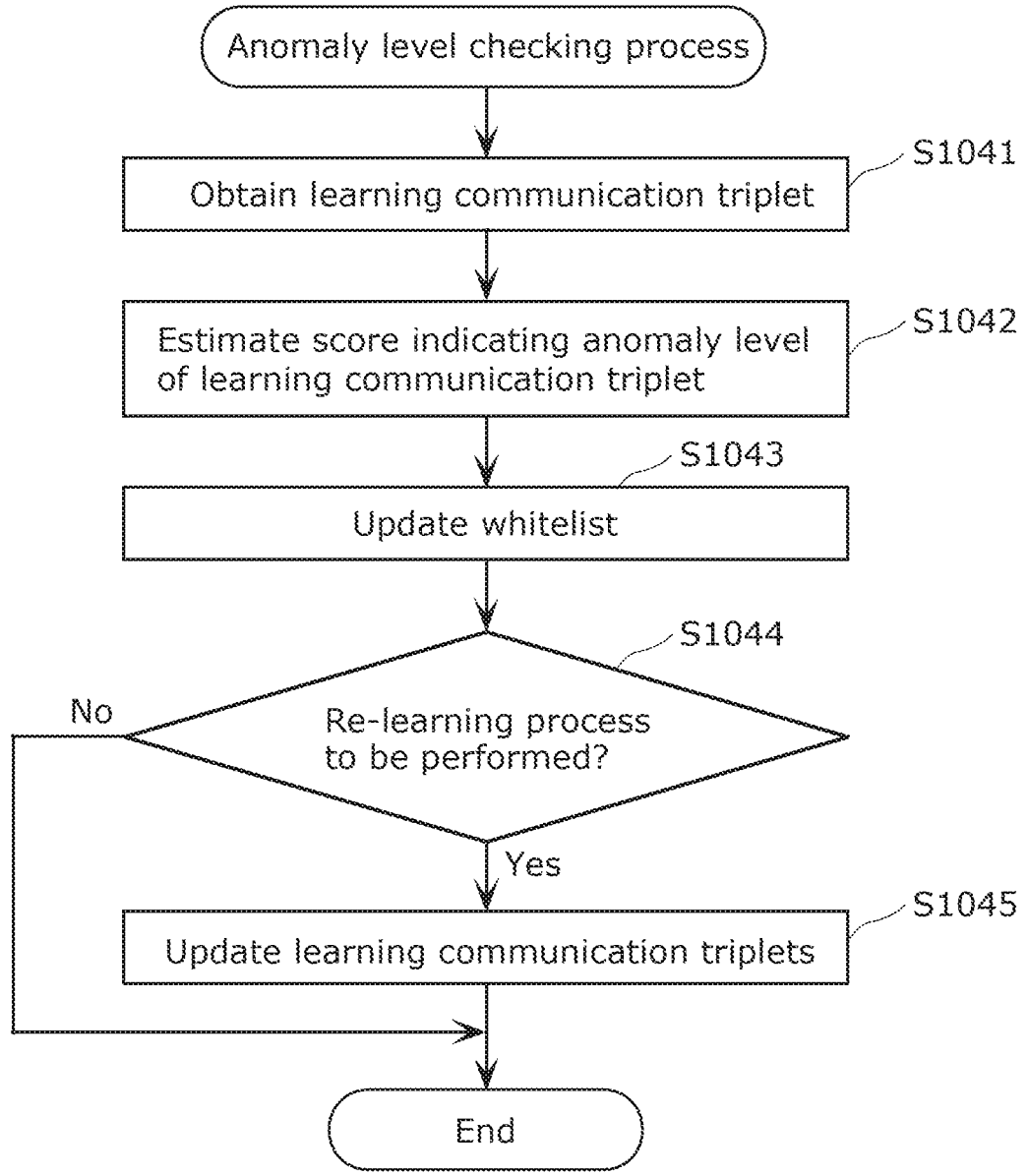
FIG. 22 is a flowchart illustrating another detailed example of the anomaly level checking process illustrated in FIG. 20.

FIG. 22 is a flowchart illustrating another detailed example of the anomaly level checking process illustrated in FIG. 20. The anomaly level checking process shown in FIG. 22 includes the process of updating whitelist 301a on the basis of the estimated score indicating the anomaly level of learning communication triplet 301.

First, learning device unit 2A included in communication monitoring system 100 obtains learning communication triplet 301 that is stored in storage 31 (S1041). In the present variation, learning device unit 2A obtains, from network communication performed in a predetermined period that is a learning period, learning communication triplet 301 that includes the plurality of third communication triplets which are extracted communication triplets.

Next, learning device unit 2A estimates a score indicating an anomaly level of learning communication triplet 301 that has been obtained in Step S1041 (S1042). In the present variation, using trained model 302, learning device unit 2A estimates, as a score indicating an anomaly level, the possibility that each of the plurality of third communication triplets emerges as network communication performed in said predetermined period.

Next, learning device unit 2A updates whitelist 301a on the basis of the anomaly level (the score indicating the anomaly level) estimated in Step S1042 (S1043). In the present variation, learning device unit 2A excludes one or more third communication triplets from the plurality of third communication triplets obtained in Step S1041, on the basis of the anomaly level (the score indicating the anomaly level) estimated in Step S1042. Subsequently, learning device unit 2A stores communication triplets obtained by excluding said one or more third communication triplets from the plurality of obtained third communication triplets, into storage 30 as whitelist 301a (the plurality of second communication triplets). In this manner, learning device unit 2A updates whitelist 301a.

Next, learning device unit 2A determines whether the re-learning process is to be performed (S1044), and when it is determined that the re-learning process is to be performed (Yes in S1044), updates learning communication triplet 301 (S1045). On the other hand, when it is determined in Step S1044 that the re-learning process is not to be performed (No in S1044), learning device unit 2A ends the processing.

5.3 Advantageous Effects, Etc.

According to the present variation, the scoring process is performed on the plurality of communication triplets used for learning, and an anomalous communication triplet can be checked. In other words, according to the present variation, the score indicating the anomaly level of each learning communication triplet 301 that is also used as whitelist 301a can be checked. This makes it possible to check whether learning communication triplets 301 that have been obtained from network communication performed in a predetermined period that is a learning period include any anomalous communication triplet.

More specifically, not all the links of the multigraph constructed using communication triplets 301 that have been obtained from network communication performed in a predetermined period that is a learning period are necessarily safe. Therefore, in the present variation, learning device unit 2A estimates scores indicating the anomaly levels of links that have already been observed, in other words, the links of the multigraph constructed at the time of learning. This allows learning device unit 2A or a user of learning device unit 2A to check, on the basis of the estimated scores indicating the anomaly levels, whether those links are normal or anomalous.

Therefore, in the present variation, on the basis of the estimated scores indicating the anomaly levels, whitelist 301a can be reviewed and updated to safer whitelist 301a. In other words, in the present variation, it is possible store, as whitelist 301a, communication triplets obtained by excluding, using the estimated scores indicating the anomaly levels, anomalous third communication triplets from the plurality of third communication triplets obtained from network communication performed in a predetermined period as a learning period.

Furthermore, in the present variation, it is possible to update learning communication triplet 301 that includes safer communication triplets obtained by excluding, using the estimated scores indicating the anomaly levels, communication triplets presumed to be unsafe (anomalous). This allows learning device unit 2A to perform the re-learning process on model 302 using updated learning communication triplet 301. In other words, it is possible to re-train model 302 using, as data for re-learning, learning communication triplet 301 that has been updated to exclude anomalous communication triplets from the plurality of communication triplets obtained from network communication performed in a predetermined period as a learning period. Thus, by using re-trained model 302, communication monitoring device 1 can minimize the risk of overlooking an anomalous communication triplet at the time of the scoring process.

Possibility of Other Embodiments

The communication monitoring method and the communication monitoring system according to one embodiment of the present disclosure have been described thus far based on the embodiment, but the present disclosure is not limited to the above-described embodiment. Various modifications to the present embodiment that can be conceived by those skilled in the art, and forms configured by combining structural elements in different embodiments, without departing from the teachings of the present disclosure, are included in the scope of the present disclosure. For example, the following cases are also included in the present disclosure.

(1) Some or all of the structural elements included in the above-described communication monitoring system is specifically a computer system configured from a microprocessor, a read only memory (ROM), a random access memory (RAM), a hard disk unit, a display unit, a keyboard, and a mouse, for example. A computer program is stored in the RAM or the hard disk unit. Each device achieves its function as a result of the microprocessor operating according to the computer program. Here, the computer program is configured of a combination of command codes indicating commands to the computer in order to achieve a predetermined function.

(2) Some or all of the structural elements included in the above-described communication monitoring system may be configured from a single system Large Scale Integration (LSI). A system LSI is a super-multifunction LSI manufactured with a plurality of components integrated on a single chip, and is specifically a computer system configured of a microprocessor, ROM, and RAM, for example. A computer program is stored in the RAM. The system LSI achieves its function as a result of the microprocessor operating according to the computer program.

(3) Some or all of the structural elements included in the above-described communication monitoring system may each be configured from an IC card that is detachably attached to each device or a stand-alone module. The IC card and the module are computer systems configured from a microprocessor, ROM, and RAM, for example. The IC card and the module may include the super-multifunction LSI described above. The IC card and the module achieve their functions as a result of the microprocessor operating according to the computer program. The IC card and the module may be tamperproof.

INDUSTRIAL APPLICABILITY

The present disclosure can be used for communication monitoring methods and systems and particularly used for communication monitoring methods and systems for implementing security measures for ICSs without imposing heavy analysis burdens on security operators.

The invention claimed is:

1. A communication monitoring method for monitoring communication in a network, the communication monitoring method comprising:
   extracting, from the communication, a first communication triplet that is a 3-tuple including information indicating a source device, information indicating a destination device, and information indicating a type of communication performed between devices;
   determining whether the first communication triplet extracted corresponds to any of a plurality of second communication triplets stored in storage in advance as a whitelist and each being a 3-tuple including information indicating a source device, information indicating a destination device, and information indicating a type of communication; and
   estimating, as a score, a possibility that the first communication triplet is suspicious, by using a model that has been trained, and outputting the score when the first communication triplet does not correspond to any of the plurality of second communication triplets, wherein
   the estimating of the score includes,
   by the model that has been trained, the following:
   converting a set of 3-tuples of the first communication triplet into a multigraph in which the information indicating the source device and the information indicating the destination device are nodes and the information indicating the type of communication is a type of an edge, and obtaining vector representation of the first communication triplet from the multigraph; and
   estimating the score from the vector representation of the first communication triplet obtained.

2. The communication monitoring method according to claim 1, wherein
   in the outputting,
   when the score is less than or equal to a threshold value, a monitoring result indicating that the communication is suspicious is output.

3. The communication monitoring method according to claim 1, wherein the model includes a relational graph convolutional network (R-GCN).

4. The communication monitoring method according to claim 1, wherein
   the estimating of the score further includes,
   by the model that has been trained, the following:
   estimating the score using a link prediction algorithm from the vector representation of the first communication triplet obtained.

5. The communication monitoring method according to claim 4, wherein
   the model includes a composition-based multi-relational graph convolutional network (COMPGCN).

6. The communication monitoring method according to claim 4, wherein the model includes any of DistMult, convolutional 2D knowledge graph embeddings (convE), translating embeddings for modeling multi-relational data (TransE), holographic embeddings of knowledge graphs (HolE), and complex embeddings for simple link prediction (ComplEx).

7. The communication monitoring method according to claim 1, wherein
   the information indicating the source device is an IP address of a server that is the source device,
   the information indicating the destination device is an IP address of a client that is the destination device, and the information indicating the type of communication includes a TCP/UDP port number or a type of an alert.

8. The communication monitoring method according to claim 1, wherein
the information indicating the source device is a MAC address or a serial number of the source device,
the information indicating the destination device is a MAC address or a serial number of the destination device, and
the information indicating the type of communication includes a type of an alert or a type of a communication command that is exchanged between the source device and the destination device.

9. The communication monitoring method according to claim 1, further comprising:
before the extracting,
obtaining the plurality of second communication triplets from network communication performed in a predetermined period; and
performing a learning process using, as data for learning, the plurality of second communication triplets obtained, the learning process including, by the model, obtaining vector representation of the plurality of second communication triplets and estimating, as a score, a possibility that the network communication performed in the predetermined period emerges as normal communication.

10. The communication monitoring method according to claim 9, wherein
in the learning process of obtaining the vector representation of the plurality of second communication triplets by the model,
a set of 3-tuples of the plurality of second communication triplets is input to the model, and training is conducted, the training including, by the model, mapping the information indicating the source device and the information indicating the destination device to vector representation of a fixed dimension and obtaining the vector representation of the plurality of second communication triplets.

11. The communication monitoring method according to claim 9, wherein
in the plurality of second communication triplets that are used as the data for learning,
in addition to the type of communication, a feature amount regarding the network communication performed in the predetermined period is included as the type of communication.

12. The communication monitoring method according to claim 11, wherein
the feature amount includes at least one of an amount of communication per unit time or a median communication time interval in the network communication performed in the predetermined period.

13. The communication monitoring method according to claim 1, further comprising:
before the extracting,
obtaining the plurality of second communication triplets from network communication performed in a predetermined period;
performing a learning process using, as data for learning, the plurality of second communication triplets obtained, the learning process including, by the model, obtaining vector representation of the plurality of second communication triplets and estimating, as a score, a possibility that the network communication performed in the predetermined period emerges as normal communication; and
estimating, as a score indicating an anomaly level, a possibility that each of the plurality of second communication triplets obtained emerges as a normal communication triplet in the communication, by using the model that has been trained, and outputting the score.

14. The communication monitoring method according to claim 1, further comprising:
before the extracting,
obtaining, from network communication performed in a predetermined period, a plurality of third communication triplets each being a 3-tuple including information indicating a source device, information indicating a destination device, and information indicating a type of communication;
performing a learning process using, as data for learning, the plurality of third communication triplets obtained, the learning process including, by the model, obtaining vector representation of the plurality of third communication triplets and estimating, as a score, a possibility that the network communication performed in the predetermined period emerges as normal communication;
estimating, as a score indicating an anomaly level, a possibility that each of the plurality of third communication triplets emerges as a normal communication triplet in the communication, by using the model that has been trained, and outputting the score; and
storing communication triplets obtained by excluding one or more third communication triplets from the plurality of third communication triplets based on the score indicating the anomaly level into the storage as the plurality of second communication triplets.

15. The communication monitoring method according to claim 14, wherein
in the learning process or the re-learning process,
a set of 3-tuples of the plurality of third communication triplets is input to the model, and training is conducted, the training including, by the model, mapping the information indicating the source device and the information indicating the destination device to vector representation of a fixed dimension and obtaining vector representation of the plurality of third communication triplets.

16. The communication monitoring method according to claim 1, further comprising:
before the extracting,
obtaining, from network communication performed in a predetermined period, a plurality of third communication triplets each being a 3-tuple including information indicating a source device, information indicating a destination device, and information indicating a type of communication;
performing a learning process using, as data for learning, the plurality of third communication triplets obtained, the learning process including, by the model, obtaining vector representation of the plurality of third communication triplets and estimating, as a score, a possibility that the network communication performed in the predetermined period emerges as normal communication;
estimating, as a score indicating an anomaly level, a possibility that each of the plurality of third communication triplets emerges as a normal communication triplet in the communication, by using the model that has been trained, and outputting the score;

performing a re-learning process using, as data for re-learning, communication triplets obtained by excluding one or more third communication triplets from the plurality of third communication triplets based on the score, the re-learning process including by the model obtaining vector representation of the plurality of third communication triplets and estimating, as a score, a possibility that the network communication performed in the predetermined period emerges as normal communication; and storing communication triplets obtained by excluding one or more third communication triplets from the plurality of third communication triplets based on the score indicating the anomaly level into the storage as the plurality of second communication triplets.

17. The communication monitoring method according to claim 1, wherein the estimating of the score includes, by the model that has been trained, the following:

obtaining vector representation of each element of the first communication triplet by mapping the information indicating the source device and the information indicating the destination device among the set of 3-tuples of the first communication triplet to vector representation of a fixed dimension; and estimating the score from the vector representation of the first communication triplet obtained.

18. A communication monitoring system for monitoring communication in a network, the communication monitoring system comprising:

a memory that stores a program; and a processor that executes the program, wherein by executing the program, the processor is configured to:

extract, from the communication, a first communication triplet that is a 3-tuple including information indicating a source device, information indicating a destination device, and information indicating a type of communication performed between devices;

determine whether the first communication triplet extracted corresponds to any of a plurality of second communication triplets stored in storage in advance as a whitelist and each being a 3-tuple including information indicating a source device, information indicating a destination device, and information indicating a type of communication; and when the first communication triplet does not correspond to any of the plurality of second communication triplets, estimate, as a score, a possibility that the first communication triplet is suspicious, by using a model that has been trained, and output the score, wherein the estimating of the score includes, by the model that has been trained, the following:

converting a set of 3-tuples of the first communication triplet into a multigraph in which the information indicating the source device and the information indicating the destination device are nodes and the information indicating the type of communication is a type of an edge, and obtaining vector representation of the first communication triplet from the multigraph; and estimating the score from the vector representation of the first communication triplet obtained.

* * * * *